(12) United States Patent
Ishikura

(10) Patent No.: US 11,546,785 B2
(45) Date of Patent: Jan. 3, 2023

(54) SERVER, RADIO COMMUNICATION SYSTEM, AND CONTROL METHOD

(71) Applicant: NEC Corporation, Tokyo (JP)

(72) Inventor: Daichi Ishikura, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/030,938

(22) Filed: Sep. 24, 2020

(65) Prior Publication Data

US 2021/0099897 A1   Apr. 1, 2021

(30) Foreign Application Priority Data

Sep. 27, 2019  (JP) .............................. JP2019-176447

(51) Int. Cl.
*H04W 24/08* (2009.01)
*H04L 43/0882* (2022.01)
*H04L 43/0823* (2022.01)
*H04W 88/08* (2009.01)

(52) U.S. Cl.
CPC ......... *H04W 24/08* (2013.01); *H04L 43/0823* (2013.01); *H04L 43/0882* (2013.01); *H04W 88/08* (2013.01)

(58) Field of Classification Search
CPC . H04L 41/142; H04L 43/0823; H04L 41/145; H04L 41/16; H04L 43/0882; H04W 24/08
See application file for complete search history.

(56) References Cited

U.S. PATENT DOCUMENTS

| 11,093,518 | B1* | 8/2021 | Lu ........................ G06F 11/3476 |
| 11,316,749 | B1* | 4/2022 | Werner ................. G06T 11/206 |
| 11,425,576 | B2* | 8/2022 | Stirling-Gallacher ...................... H04W 56/001 |
| 2016/0113022 | A1* | 4/2016 | Tsutsui .................. H04W 24/08 370/329 |
| 2017/0124478 | A1* | 5/2017 | Baradaran ........... H04L 63/1425 |
| 2017/0295502 | A1* | 10/2017 | Stirling-Gallacher ...................... H04W 56/001 |
| 2017/0347292 | A1* | 11/2017 | Ho ........................ H04W 24/02 |
| 2018/0248905 | A1* | 8/2018 | Côté ......................... G06N 3/08 |
| 2019/0306044 | A1* | 10/2019 | Cohen .................. H04L 67/535 |
| 2020/0153645 | A1* | 5/2020 | Sutton .................. H04M 15/61 |
| 2021/0117425 | A1* | 4/2021 | Rao ........................... G06F 8/61 |
| 2021/0279632 | A1* | 9/2021 | Di Pietro .............. H04L 41/147 |
| 2021/0351973 | A1* | 11/2021 | Ford .................... H04L 41/0631 |
| 2022/0019451 | A1* | 1/2022 | Crabtree ................ G06N 20/00 |

FOREIGN PATENT DOCUMENTS

JP         2018-195929 A      12/2018

* cited by examiner

*Primary Examiner* — Syed Ali
(74) *Attorney, Agent, or Firm* — Sughrue Mion, PLLC

(57) ABSTRACT

In the present disclosure, a plurality of types of data are received from a base station and these pieces of data are learned, whereby a first model capable of calculating an estimated value of an index indicating an operation status of the base station is generated. Then this estimated value is compared to a measured value of the index indicating the operation status of the base station.

12 Claims, 18 Drawing Sheets

SERVER, RADIO COMMUNICATION SYSTEM, AND CONTROL METHOD

INCORPORATION BY REFERENCE

This application is based upon and claims the benefit of priority from Japanese patent application No. 2019-176447, filed on Sep. 27, 2019, the disclosure of which is incorporated herein in its entirety by reference.

TECHNICAL FIELD

The present disclosure relates to a server including a function of detecting an abnormality in a base station, and a control method of the server.

BACKGROUND ART

In recent years, with the rapid increase in the amount of traffic, the importance of radio communication networks has increased. When an abnormality occurs in a radio base station, it is possible that this abnormality may severely disrupt people's lives. It is therefore required to accurately grasp whether or not there is an abnormality in a radio base station.

For example, Japanese Unexamined Patent Application Publication No. 2018-195929 discloses a method of detecting an abnormality in a radio base station, in which time-series data of a future traffic amount is estimated from time-series data of a past traffic amount, and then the time-series data of the future traffic amount is compared with an actual traffic amount, whereby an abnormality is detected.

In a building or a place where a large number of people gather in a specific time zone or on a specific date such as a stadium or an event space, however, it is difficult to estimate the time-series data of the future traffic amount only from the time-series data of the past traffic amount. Therefore, it is considered that, with the device disclosed in Japanese Unexamined Patent Application Publication No. 2018-195929, it is impossible to estimate a sudden increase in the traffic amount due to holding events, a sudden decrease in the traffic amount due to end of events etc. As a result, it is possible that an abnormality that should be occurring may not be detected or an abnormality that has not yet occurred may be falsely detected.

SUMMARY

One example of objects of the present disclosure is to provide a server capable of detecting an abnormality in a radio base station more accurately and a control method of the server.

A server in one example of objects of the present disclosure includes:
a receiver configured to receive a plurality of types of data from a base station;
a first model generator configured to generate a first model from the plurality of types of data;
a calculation unit configured to calculate an estimated value of an index indicating an operation status of the base station using the first model generated by the first model generator; and
a first determination unit configured to compare the estimated value of the index indicating the operation status of the base station and a measured value of the index indicating the operation status of the base station and determine that there is an abnormality in the base station when the result of the comparison does not satisfy a criterion.

A server in one example of objects of the present disclosure includes:
a receiver configured to receive a plurality of types of data from each of a plurality of base stations;
a first model generator configured to generate a first model from the plurality of types of data in a base station other than a base station regarding which it is determined whether it has an abnormality;
a calculation unit configured to calculate an estimated value of an index indicating an operation status of the base station regarding which it is determined whether it has an abnormality using the plurality of types of data in the base station regarding which it is determined whether it has an abnormality and the first model generated by the first model generator; and
a first determination unit configured to compare the estimated value of the index indicating the operation status of the base station regarding which it is determined whether it has an abnormality with a measured value of the index indicating the operation status of the base station and determine that there is an abnormality in the base station when the consistency between the estimated value and the measured value does not satisfy a criterion.

A control method of a server in one example of objects of the present disclosure includes:
receiving a plurality of types of data from a base station;
generating a first model from the plurality of types of data;
calculating an estimated value of an index indicating an operation status of the base station using the first model; and
comparing the estimated value of the index indicating the operation status of the base station with a measured value of the index indicating the operation status of the base station and determining that there is an abnormality in the base station when the estimated value and the measured value do not satisfy a criterion.

BRIEF DESCRIPTION OF DRAWINGS

The above and other aspects, features and advantages of the present disclosure will become more apparent from the following description of certain exemplary embodiments when taken in conjunction with the accompanying drawings, in which.

EMBODIMENTS

Hereinafter, with reference to the drawings, example embodiments for implementing the present disclosure will be described.

First Example Embodiment

Figure 1:
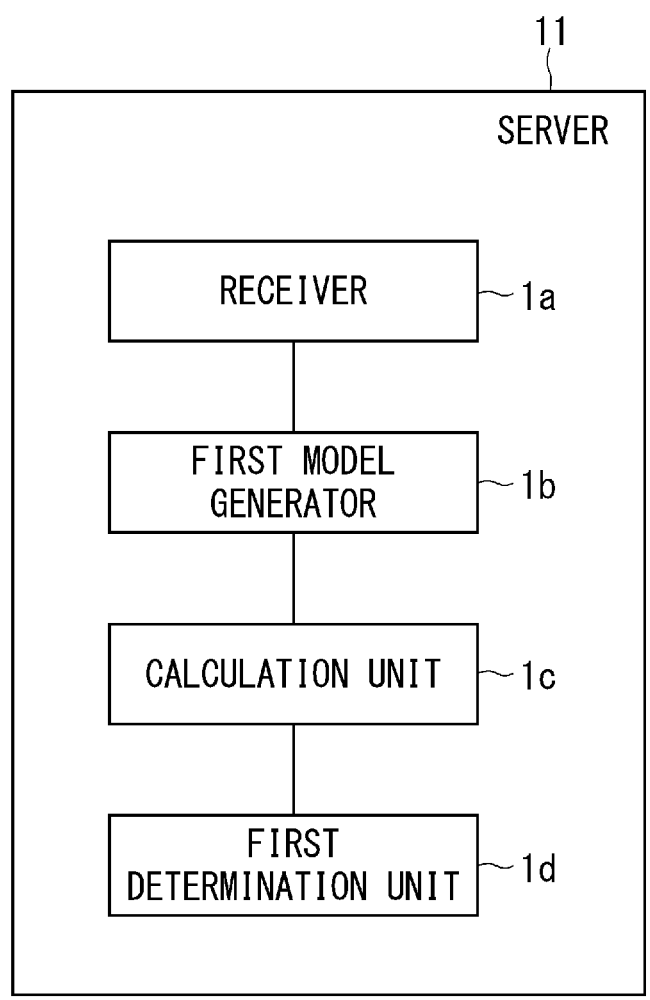
FIG. 1 is a block diagram showing one example of a configuration of a server according to a first example embodiment.

With reference to FIG. 1, a server according to a first example embodiment will be described. FIG. 1 is a block diagram showing one example of a configuration of the server.

As shown in FIG. 1, a server 11 according to this example embodiment includes a receiver 1a, a first model generator 1b, a calculation unit 1c, and a first determination unit 1d.

The receiver 1a receives a plurality of types of data from a base station. The first model generator 1b generates a first model using the plurality of types of data received by the receiver 1a. The calculation unit 1c calculates an estimated value of an index indicating an operation status of the base station from the first model. The first determination unit 1d compares the calculated estimated value of the index indicating the operation status of the base station with a measured value of the index indicating the operation status of the base station. When the result of the comparison does not satisfy a criterion, the first determination unit 1d determines that there is an abnormality in the base station.

Figure 2:
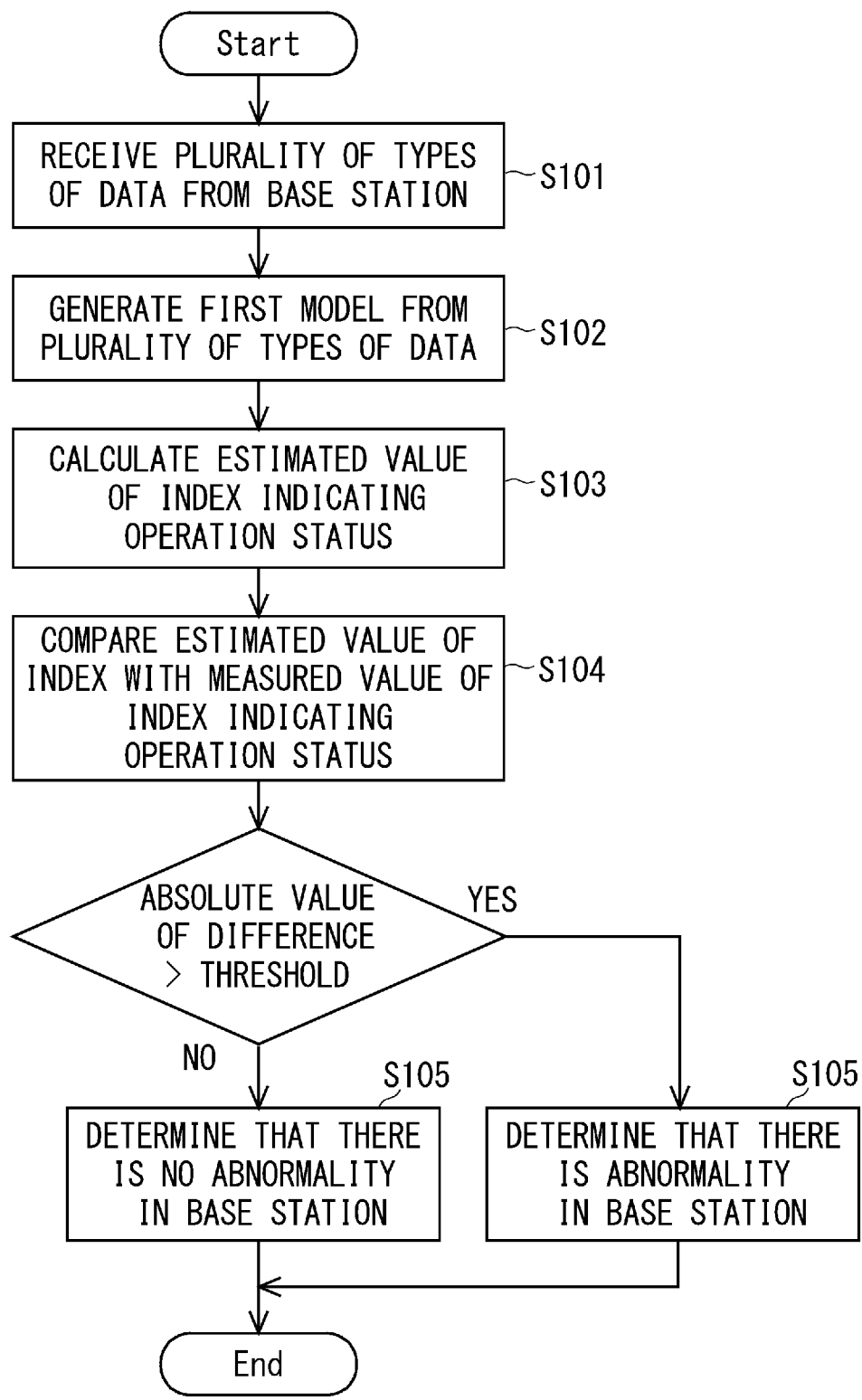
FIG. 2 is a flowchart showing one example of processing of the server according to the first example embodiment.

Next, with reference to FIG. 2, an operation of the server 11 according to this example embodiment will be described in further detail. FIG. 2 is a flowchart showing one example of the processing in this example embodiment.

[Step S101] The receiver 1a receives the plurality of types of data from the base station connected to the server. The plurality of types of data are, for example, but not limited to, two or more pieces of data of an index related to a radio quality such as a Received Signal Strength Indicator (RSSI), a propagation loss rate, bandwidth, a Discontinuous Transmission (DTX) rate, a Signal-to-Interference plus Noise power Ratio (SINR) or the like, user distribution of the index related to the radio quality, various completion rates (a Radio Resource Control (RRC) connection success rate and so on), a traffic amount, uplink throughput, downlink throughput, the number of users who are present in an area formed by the base station, a radio frequency of the base station, specification data of the base station, and information regarding installation of the base station. The information regarding installation of the base station is, for example, but not limited to, positional information of the base station, the angle of an antenna of the base station, information on the area that the base station covers and so on. By using the information regarding installation of the base station such as the positional information of the base station as well for the learning, the effect of improving the accuracy of the estimated value that the first model calculates can be obtained.

[Step S102] The first model generator 1b generates the first model using a machine learning algorithm from the plurality of types of data that have been received. The first model generator 1b generates, for example, a first model for estimating the traffic amount. The first model generator 1b generates the first model at least using two types of data including data indicating the traffic amount and data other than the data indicating the traffic amount among the plurality of types of data that have been received. The machine learning algorithm used in this example embodiment may be an existing machine learning algorithm or may be a machine learning algorithm that will be developed in the future. Further, the type of a model expression in the first model used in this example embodiment may be an existing type or may be any type that will be developed in the future.

[Step S103] The calculation unit 1c calculates the estimated value of the index indicating the operation status of the base station from the generated first model. The index indicating the operation status of the base station may be, for example, an index related to the radio quality such as the RSSI, the propagation loss rate, the bandwidth, the DTX rate, the SINR or the like, various completion rates (the RRC connection success rate and so on), the traffic amount, the uplink throughput, the downlink throughput or the like. However, it is sufficient that the index be the one indicating the operation status of the base station and it is not limited to the ones described above.

[Step S104] The first determination unit 1d compares the calculated estimated value of the index indicating the operation status of the base station with the measured value of the index indicating the operation status of the base station.

[Step S105] The first determination unit 1d determines that there is no abnormality when the result of the comparison satisfies the criterion and determines that there is an abnormality when the result of the comparison does not satisfy the criterion. The method of the comparison may be, for example, a method of calculating the absolute value of the difference between the estimated value and the measured value and determining that there is an abnormality when the absolute value exceeds a predetermined threshold. Further, the first determination unit 1d may determine that there is an abnormality when the ratio of the measured value with respect to the estimated value is below the threshold and may determine that there is an abnormality when the ratio of the estimated value with respect to the measured value exceeds the threshold.

As described above, the server 11 generates the first model using the plurality of types of data received from the base station and compares the estimated value of the index indicating the operation status of the base station calculated using the first model with the measured value of the index indicating the operation status of the base station, thereby determining whether there is an abnormality. Accordingly, the server 11 is able to detect an abnormality in the base station more accurately.

Second Example Embodiment

Figure 3:
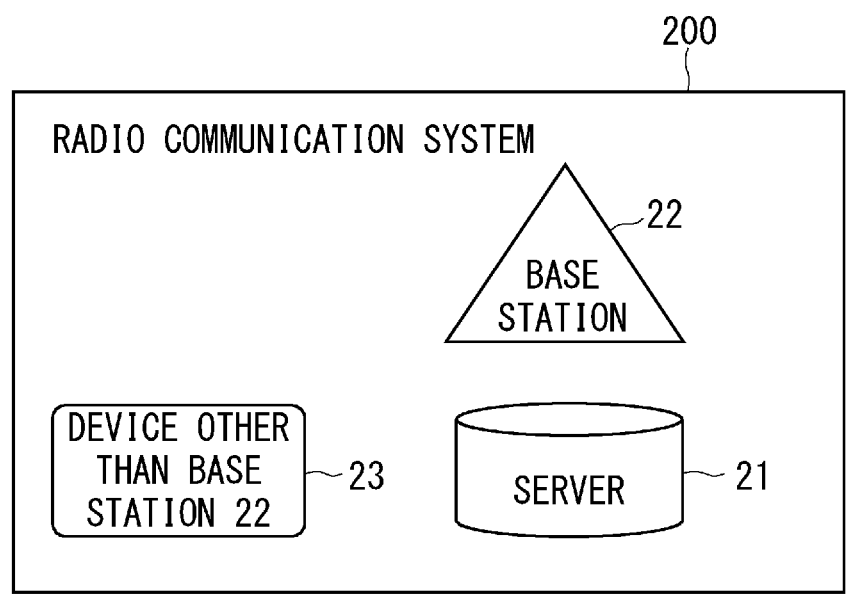
FIG. 3 is a diagram showing one example of a radio communication system according to a second example embodiment.
Figure 4:
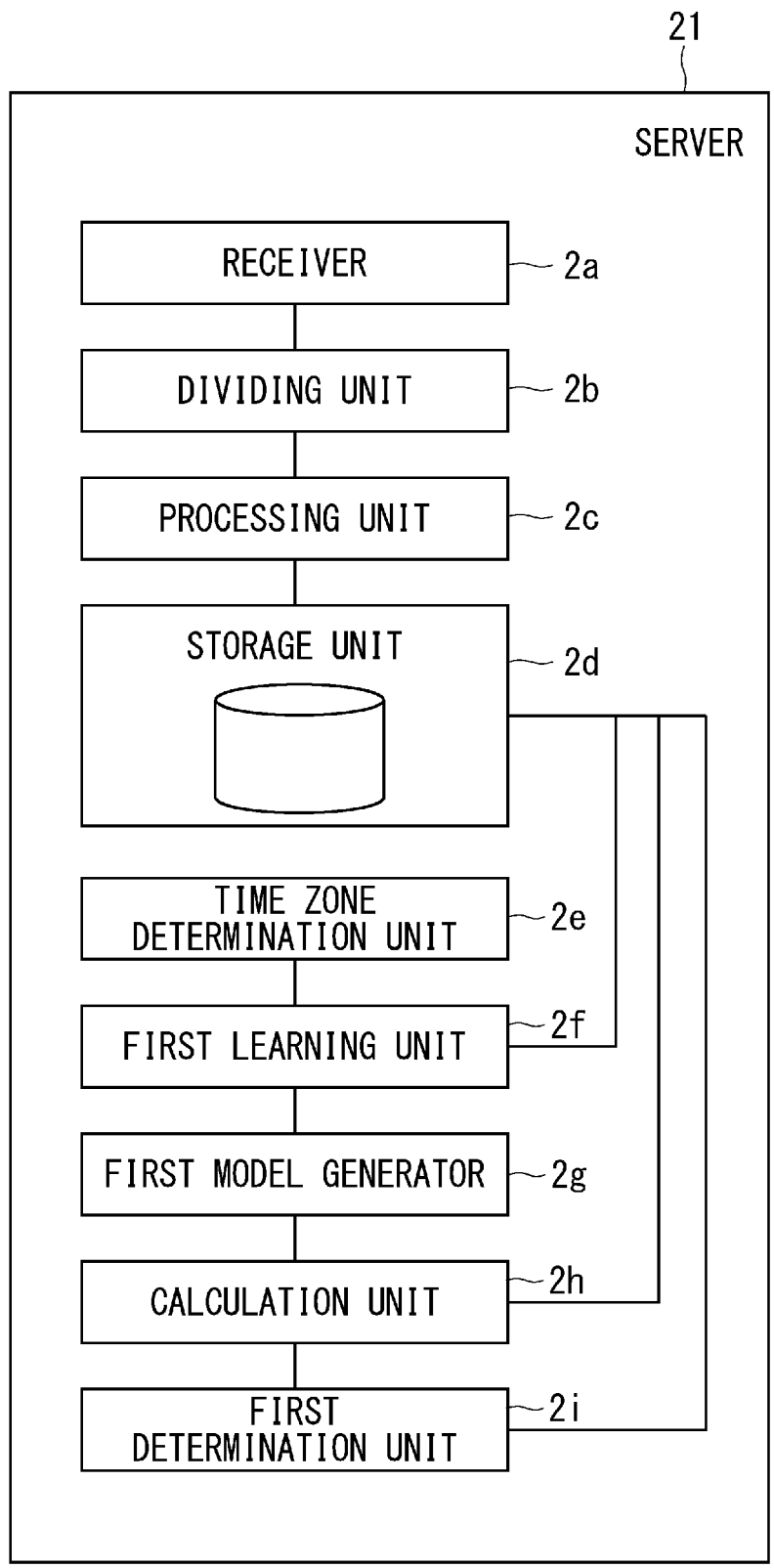
FIG. 4 is a block diagram showing one example of a configuration of a server according to the second example embodiment.

Next, a second example embodiment will be described. FIG. 3 shows one example of a radio communication system 200 according to the second example embodiment. The radio communication system 200 includes a server 21, a base station 22, and a device 23 other than the base station 22. FIG. 4 shows one example of the server 21. The server 21 includes a receiver 2a, a dividing unit 2b, a processing unit 2c, a storage unit 2d, a time zone determination unit 2e, a first learning unit 2f, a first model generator 2g, a calculation unit 2h, and a first determination unit 2i. The server 21 is connected to, for example, the base station 22 and the device 23.

The receiver 2a receives a plurality of types of data from the base station 22 and receives data that relates to the base station 22 from the device 23. The dividing unit 2b divides the plurality of types of data that have been received and the data that relates to the base station 22 into a measured value of a first index indicating the operation status of the base station 22 (hereinafter it will be referred to as a first index) and a measured value of a second index indicating the operation status of the base station 22 (hereinafter it will be referred to as a second index). The processing unit 2c performs processing on the divided measured values. The storage unit 2d stores the measured value on which the processing has been performed. The time zone determination unit 2e determines a time zone T1 in which it is determined whether there is an abnormality in the base station 22. The first learning unit 2f learns the relation among the measured value V11 of the first index in the time zone T1 in which it is determined whether there is an abnormality in the base station 22, the measured value V12 of the first index in a time zone other than the time zone T1 in which it is determined whether there is an abnormality in the base station 22, the measured value V21 of the second index in the time zone T1 in which it is determined whether there is an abnormality in the base station 22, and the measured value V22 of the second index in a time zone other than the time zone T1 in which it is determined whether there is an abnormality in the base station 22. Note that the first learning unit 2f may exclude the measured value V11 of the first index in the time zone T1 in which it is determined whether there is an abnormality in the base station 22 and the measured value V21 of the second index in the time zone T1 in which it is determined whether there is an abnormality in the base station 22 from the learning target when it performs learning. The first model generator 2g generates a first model from the results of the learning. The calculation unit 2h calculates the estimated value of the first index in the time zone T1 in which it is determined whether there is an abnormality in the base station 22 using the measured value V21 of the second index in the time zone T1 in which it is determined whether there is an abnormality in the base station 22 and the first model. The first determination unit 2i compares the estimated value of the first index in the time zone T1 in which it is determined whether there is an abnormality in the base station 22 with the measured value V11 of the first index in the time zone T1 in which it is determined whether there is an abnormality in the base station 22, and determines that there is an abnormality in the base station 22 when the result of the comparison does not satisfy the criterion.

Figure 5A:
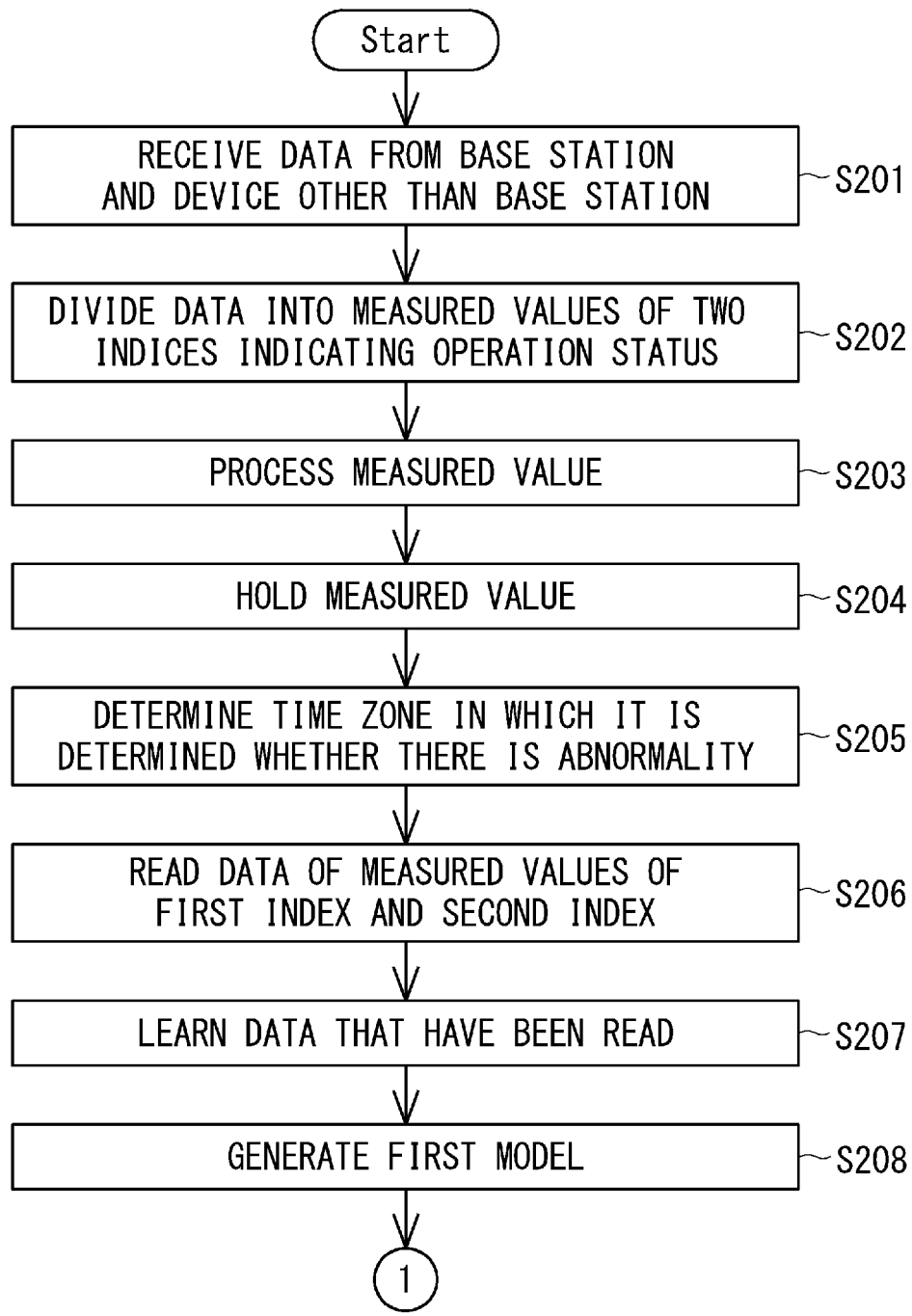
FIG. 5A is a flowchart showing one example of processing of the server according to the second example embodiment.
Figure 5B:
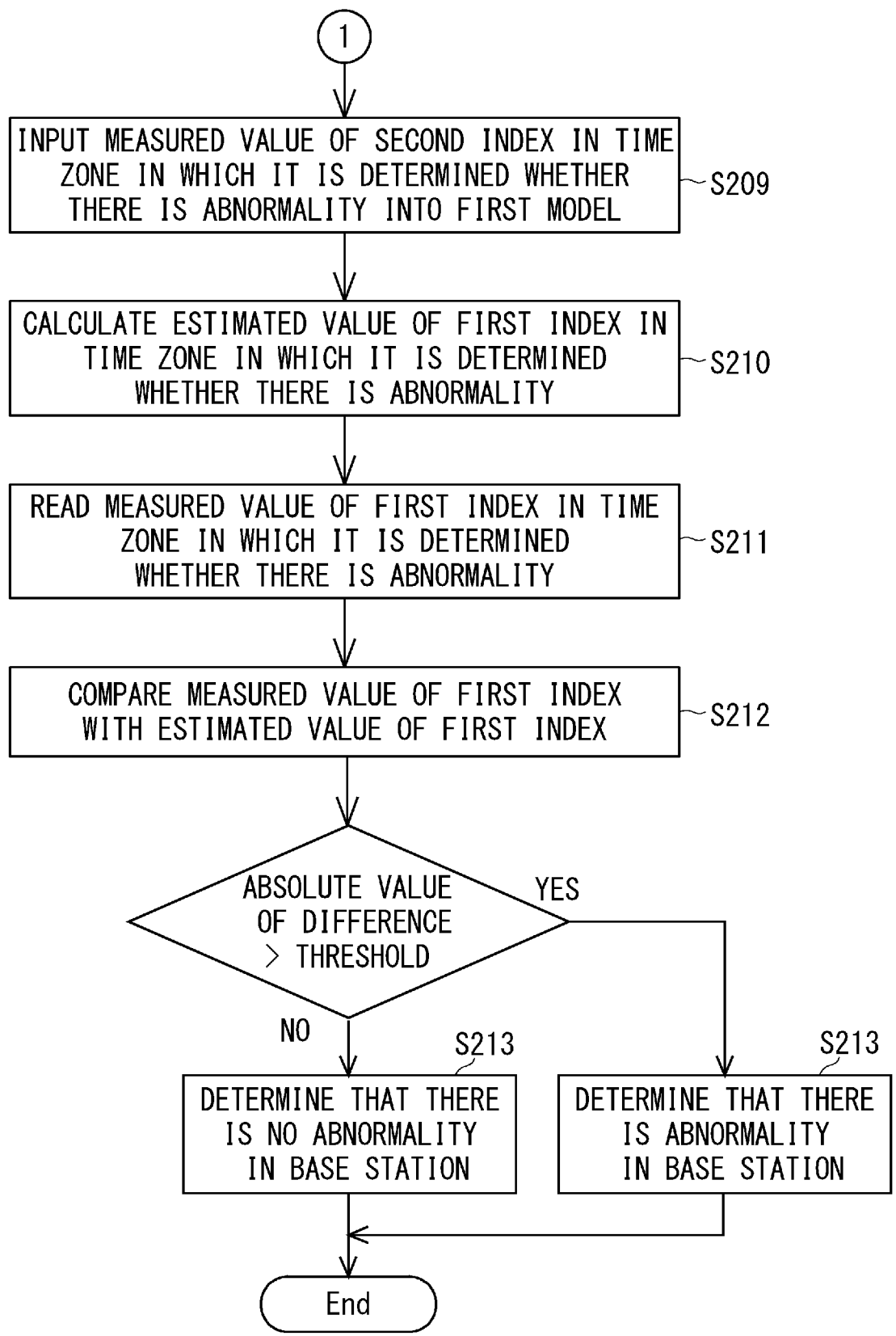
FIG. 5B is a flowchart showing one example of processing of the server according to the second example embodiment.

With reference next to FIGS. 5A and 5B, an operation of the server 21 according to this example embodiment will be described in further detail. FIGS. 5A and 5B are flowcharts showing processing in this example embodiment.

[Step S201] The receiver 2a receives the plurality of types of data from the base station 22 and further receives data that relates to the base station 22 from the device 23. The data that relates to the base station 22 is, for example, but not limited to, statistical data regarding the type of an application that the user is using. Further, the method of receiving data includes, but not limited to, a method of constructing a system and automatically receiving the data, or a method of downloading, by a person, data from the device 23 and uploading this data onto the server 21.

[Step S202] The dividing unit 2b divides the plurality of types of data received by the receiver 2a into the measured value of the first index indicating the operation status of the base station 22 and the measured value of the second index indicating the operation status of the base station 22. The first index is, for example, data of the type related to the traffic amount. The data of the type related to the traffic may be, for example, the traffic amount. The first index may also be, but not limited to, an index related to the radio quality such as the RSSI, the propagation loss rate, the bandwidth, the DTX rate, the SINR or the like, the user distribution of the index related to the radio quality, various completion rates (the RRC connection success rate and so on), the uplink throughput, the downlink throughput, the number of users who are present in the area formed by the base station 22, the radio frequency of the base station 22, the specification data of the base station 22, the information regarding installation of the base station 22 or the like. The information regarding installation of the base station 22 is, for example, but not limited to, positional information of the base station 22, the angle of the antenna of the base station 22, information on the area that the base station 22 covers or the like. The second index is data of the type for estimating the first index. When, for example, the first index is a traffic amount, the second index is data of the type for estimating the traffic amount. Specifically, the second index in this case may be, but not limited to, an index related to the radio quality such as the RSSI, the propagation loss rate, the bandwidth, the DTX rate, the SINR or the like, the user distribution of the index related to the radio quality, various completion rates (the RRC connection success rate and so on), the uplink throughput, the downlink throughput, the number of users who are present in the area formed by the base station 22, the radio frequency of the base station 22, the specification data of the base station 22, the information regarding installation of the base station 22 or the like excluding the traffic amount that is used as the first index. The information regarding installation of the base station 22 may be, for example, but not limited to, positional information of the base station 22, the angle of the antenna of the base station 22, information on the area that the base station 22 covers or the like. Further, when, for example, the first index is the SINR, the second index is data of the type for estimating the SINR. Specifically, the second index in this case may be, but not limited to, an index that relates to the radio quality such as the RSSI, the propagation loss rate, the bandwidth, and the DTX rate, the user distribution of the index related to the radio quality, various completion rates (the RRC connection success rate and so on), the traffic amount, the uplink throughput, the downlink throughput, the number of users who are present in the area formed by the base station 22, the radio frequency of the base station 22, the specification data of the base station 22, or the information regarding installation of the base station 22 or the like excluding the SINR set as the first index. The information regarding installation of the base station 22 may be, for example, but not limited to, positional information of the base station 22, the angle of the antenna of the base station 22, information on the area that the base station 22 covers or the like.

[Step S203] The processing unit 2c performs processing on the divided data. The divided data includes data that is fixed for each base station 22 or data having a format of time series in which a change over time of the data is recorded. Appropriate processing may be performed on the data having a format of time series since units of time axis may vary in this data. The appropriate processing includes combination/division of data having a format of time series, exclusion of an abnormal value, average value/maximum value processing with a defined section. Further, new type of data may be defined and it may be added to the first index or the second index. For example, the following type of data may be defined and it may be added to the first index or the second index.

$$\text{Number of users normalized by bandwidth} = \frac{\text{Number of users}}{\text{Bandwidth}}$$

The aforementioned type of data is an example in which the knowledge that even when the number of users is constant, the degree of congestion varies if the bandwidth differs is converted into data and defined. As described above, the processing unit 2c defines the new type of data and may add it to the first index or the second index.

[Step S204] The storage unit 2d stores the measured value of the first index and the measured value of the second index in the storage unit 2d in the server.

[Step S205] The time zone determination unit 2e determines the time zone T1 in which it is determined whether there is an abnormality in the base station 22. The time zone in which it is determined whether an abnormality is present may either be a specific time zone or be a plurality of time zones. Further, the length of the time zone that is set may be a few minutes when it is set short and may be a few months when it is set long.

[Step S206] The first learning unit 2f reads the measured value of the first index and the measured value of the second index from the storage unit 2d as the training data.

[Step S207] The first learning unit 2f learns the data read from the storage unit 2d using the machine learning algorithm.

With reference to Table 1, an operation of the first learning unit 2f according to this example embodiment will be described in further detail. Table 1 is a table for describing the types of the measured value of the first index and the measured value of the second index used in this example embodiment.

TABLE 1

|  | Time zone T1 in which it is determined whether there is abnormality | Time zone other than time zone T1 in which it is determined whether there is abnormality |
|---|---|---|
| Measured value of first index | V11 | V12 |
| Measured value of second index | V21 | V22 |

The first learning unit 2f learns the relation among the measured value V11, the measured value V12, the measured value V21, and the measured value V22. The machine learning algorithm used in this example embodiment may be the existing machine learning algorithm or may be a machine learning algorithm that will be developed in the future. For example, the first learning unit 2f may use the machine learning algorithm such as a linear regression or a neural network. Further, in this example embodiment, the measured value V12 of the first index and the measured value V22 of the second index in a time zone other than the time zone T1 in which it is determined whether there is an abnormality in the base station 22 excluding the measured value V11 of the first index and the measured value V21 of the second index in the time zone T1 in which it is determined whether there is an abnormality in the base station 22 may be used as training data. By not using the data in the time zone T1 in which it is determined whether there is an abnormality in the base station 22 for learning, it can be expected that the effect of improving the reliability of the first model will be obtained.

[Step S208] The first model generator 2g generates a first model indicating the relation between the measured value of the first index and the measured value of the second index from the results of the learning. The first model according to this example embodiment is a model expression that can express an objective variable by explanatory variables of one or more types using the measured value of the first index as the objective variable and the measured value of the second index as the explanatory variable. Expression 1 is an example of the first model when the throughput is used as the objective variable and the SINR, the bandwidth, and the number of users are used as the explanatory variables. Further, Expression 2 is an example of the first model when the SINR is used as the objective variable, and the RSSI and the propagation loss rate are used as the explanatory variables.

$$\text{Throughput} = 0.3 * SINR + 0.5 * \frac{\text{Bandwidth}}{\text{Number of users}} \quad \text{[Expression 1]}$$

$$SINR = 1.2 * RSSI - 1.3 * \text{Propagation loss rate} \quad \text{[Expression 2]}$$

As described above, the first model generator 2g generates a model expression in which the objective variable can be indicated by the explanatory variable. The type of the model expression in the first model used in this example embodiment may either be an existing type or be any type that will be developed in the future. The objective variable is not limited to the throughput or the SINR. Likewise, the explanatory variable is not limited to the SINR, the bandwidth, the number of users, and the propagation loss rate. When the traffic amount is used as the objective variable, the first model generator 2g may use data of the type related to the traffic amount and data of the type for estimating the traffic amount as the explanatory variables. By using the data of the type related to the traffic amount and the data of the type for estimating the traffic amount for generating the first model, the effect of improving the accuracy of the first model generated by the first model generator 2g can be obtained. Further, the first model generator 2g may use the information regarding installation of the base station for generating the first model. By using the information regarding installation of the base station for generating the first model, the effect of improving the accuracy of the first model generated by the first model generator 2g can be obtained.

[Step S209] The calculation unit 2h inputs the measured value V21 of the second index in the time zone T1 in which it is determined whether there is an abnormality in the base station 22 into the first model.

[Step S210] The calculation unit 2h calculates the estimated value of the first index in the time zone in which it is determined whether there is an abnormality in the base station 22 using the measured value V21 and the first model. Consider a case in which, for example, it is desired to estimate the traffic amount in the time zone T1 in which it is determined whether there is an abnormality in the base station 22. The calculation unit 2h inputs, in accordance with the model expression of the first model in which the traffic amount is used as the objective variable, the necessary explanatory variable into the first model, and calculates the traffic amount in the time zone in which it is determined whether there is an abnormality in the base station 22.

[Step S211] The first determination unit 2i reads the measured value V11 of the first index in the time zone T1 in which it is determined whether there is an abnormality in the base station 22 from the storage unit 2d.

[Step S212] The first determination unit 2i compares the measured value V11 of the first index with the estimated value of the first index in the time zone T1 in which it is determined whether there is an abnormality in the base station 22, the estimated value of the first index being calculated in [Step S210]. The method of the comparison may be performed by, for example, calculating the absolute value of the difference between the estimated value and the measured value. Further, the first determination unit 2i may calculate either the ratio of the measured value with respect to the estimated value or the ratio of the estimated value with respect to the measured value.

[Step S213] The first determination unit 2i determines that there is no abnormality in the base station 22 when the result of the comparison satisfies the criterion and determines that there is an abnormality in the base station 22 when the result of the comparison does not satisfy the criterion. According to the criterion of the determination, it may be determined that there is an abnormality when, for example, the absolute value of the difference between the estimated value and the measured value exceeds a predetermined threshold. Further, the first determination unit 2i may determine that there is an abnormality when the ratio of the measured value with respect to the estimated value is below the threshold or may determine that there is an abnormality when the ratio of the estimated value with respect to the measured value exceeds the threshold.

As described above, the server 21 generates the first model using the plurality of types of data received from the base station 22 and the device 23, compares the estimated value of the first index of the base station 22 calculated using the first model with the measured value V11 of the first index of the base station 22, and determines whether there is an abnormality. According to this example embodiment, the server 21 is able to receive the data related to the base station not only from the base station 22 but also from the device 23, and it is therefore possible to generate the first model using more types of data. It is therefore possible to generate the first model capable of calculating the more accurate estimated value. Further, by not using the data in the time zone in which it is determined whether an abnormality is present for generating the first model, the reliability of the first model is improved.

Third Example Embodiment

Figure 6:
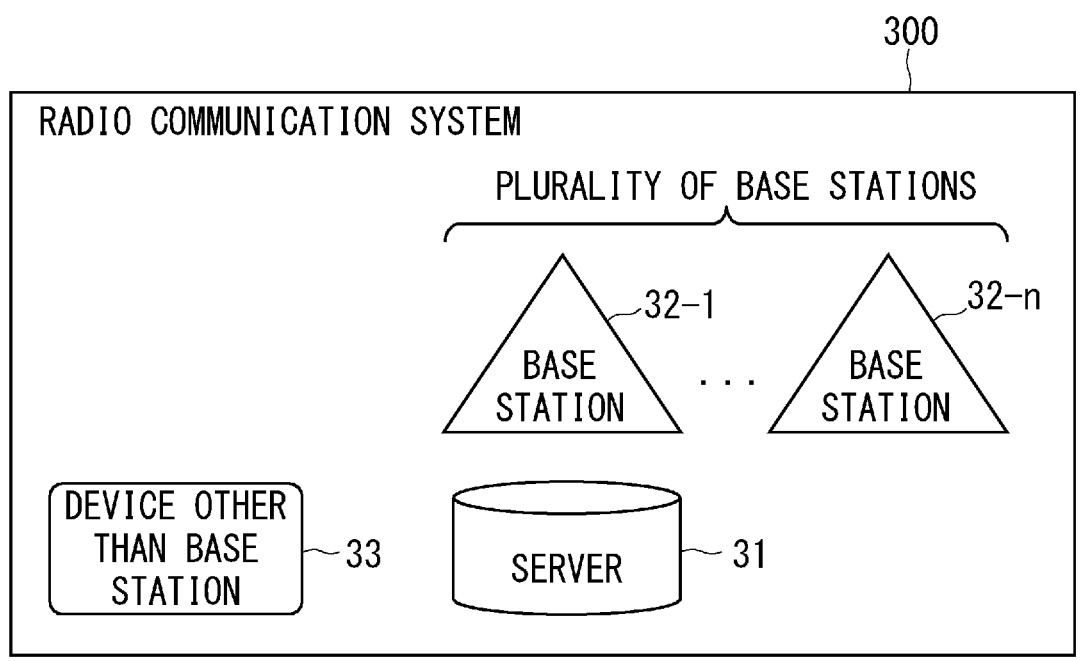
FIG. 6 is a diagram showing one example of a radio communication system according to a third example embodiment.
Figure 7:
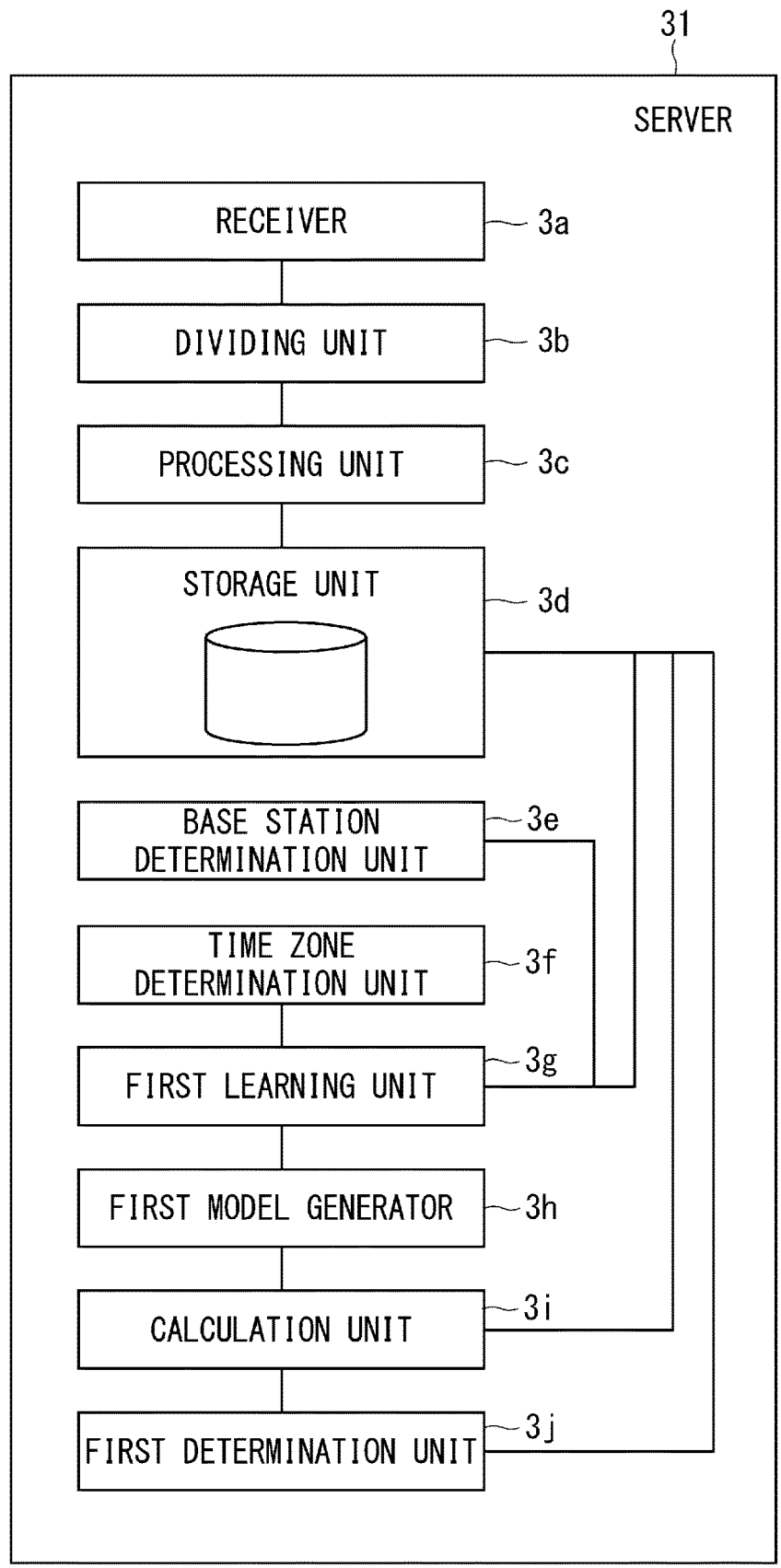
FIG. 7 is a block diagram showing one example of a configuration of a server according to the third example embodiment.

Next, a third example embodiment will be described. FIG. 6 shows one example of a radio communication system 300 according to this example embodiment. The radio communication system 300 includes a server 31, a plurality of base stations 32-1 to 32-n, and a device 33 other than the plurality of base stations 32-1 to 32-n. FIG. 7 shows one example of the server 31. The server 31 includes a receiver 3a, a dividing unit 3b, a processing unit 3c, a storage unit 3d, a base station determination unit 3e, a time zone determination unit 3f, a first learning unit 3g, a first model generator 3h, a calculation unit 3i, and a first determination unit 3j. The server 31 is connected to, for example, the base stations 32-1 to 32-n and the device 33.

The receiver 3a receives a plurality of types of data from each of the plurality of base stations 32-1 to 32-n and receives data related to each of the plurality of base stations 32-1 to 32-n from the device 33. The dividing unit 3b divides the plurality of types of data and the data related to each of the plurality of base stations 32-1 to 32-n that have been received into a measured value of a first index indicating the operation status of each of the plurality of base stations 32-1 to 32-n (hereinafter it will be referred to as a first index) and a measured value of a second index indicating the operation status of each of the plurality of base stations 32-1 to 32-n (hereinafter it will be referred to as a second index). The processing unit 3c performs appropriate processing on the divided measured values. The storage unit 3d stores the measured value on which the processing has been performed. The base station determination unit 3e determines a base station 32-X regarding which it is determined whether an abnormality is present among the plurality of base stations 32-1 to 32-n. The time zone determination unit 3f determines a time zone T2 in which it is determined whether an abnormality is present in the base station 32-X regarding which it is determined whether an abnormality is present.

With reference to Table 2, a description will be given of the first learning unit 3g. The symbol n in Table 2 is a natural number.

TABLE 2

| Base station | | Base station 32-X regarding which it is determined whether there is abnormality | | Base station 32-1 other than base station 32-X regarding which it is determined whether there is abnormality | | ... | Base station 32-n other than base station 32-X regarding which it is determined whether there is abnormality | |
|---|---|---|---|---|---|---|---|---|
| | Time zone | Time zone T2 in which it is determined whether there is abnormality | Time zone other than time zone T2 in which it is determined whether there is abnormality | Time zone T2 in which it is determined whether there is abnormality | Time zone other than time zone T2 in which it is determined whether there is abnormality | ... | Time zone T2 in which it is determined whether there is abnormality | Time zone other than time zone T2 in which it is determined whether there is abnormality |
| | Measured value of first index | V31 | V32 | V31-1 | V32-1 | ... V31-n | | V32-n |
| Second index | Measured value of type A | V41-A | V42-A | V41-A-1 | V42-A-1 | ... V41-A-n | | V42-A-n |
| | ... | ... | ... | ... | ... | ... ... | | ... |
| | Measured value of type N | V41-N | V42-N | V41-N-1 | V42-N-1 | ... V41-N-n | | V42-N-n |

In Table 2, V31 denotes a measured value of the first index in the time zone T2 in which it is determined whether an abnormality is present in the base station 32-X regarding which it is determined whether an abnormality is present. The symbol V32 denotes a measured value of the first index in a time zone other than the time zone T2 in which it is determined whether an abnormality is present in the base station 32-X regarding which it is determined whether an abnormality is present. The symbols V41-A to V41-N denote measured values from the type A to the type N among the second indices in the time zone T2 in which it is determined whether an abnormality is present in the base station 32-X regarding which it is determined whether an abnormality is present. The symbols V42-A to V42-N denote measured values from the type A to the type N among the second indices in a time zone other than the time zone T2 in which it is determined whether an abnormality is present in the base station 32-X regarding which it is determined whether an abnormality is present. Likewise, V31-1 to V31-$n$ are measured values of the first index in the time zone T2 in which it is determined whether there are abnormalities in the base stations 32-1 to 32-$n$ other than the base station 32-X regarding which it is determined whether an abnormality is present. The symbols V32-1 to V32-$n$ are measured values of the first index in a time zone other than the time zone T2 in which it is determined whether there are abnormalities in the base stations 32-1 to 32-$n$ other than the base station 32-X regarding which it is determined whether an abnormality is present. The symbols V41-A-1 to V41-N-1 are measured values from the type A to the type N among the second indices in the time zone T2 in which it is determined whether there is an abnormality in the base station 32-1 other than the base station 32-X regarding which it is determined whether an abnormality is present. The symbols V42-A-1 to V42-N-1 denote measured values from the type A to the type N among the second indices in a time zone other than the time zone T2 in which it is determined whether there is an abnormality in the base station 32-1 other than the base station 32-X regarding which it is determined whether an abnormality is present. The symbols V41-A-n to V41-N-n denote measured values from the type A to the type N among the second indices in the time zone T2 in which it is determined whether there is an abnormality in the base station 32-$n$ other than the base station 32-X regarding which it is determined whether an abnormality is present. The symbols V42-A-n to V42-N-n denote measured values from the type A to the type N among the second indices in a time zone other than the time zone T2 in which it is determined whether there is an abnormality in the base station 32-1 other than the base station 32-X regarding which it is determined whether an abnormality is present. The first learning unit 3g learns the relation among the measured value V31, the measured value V32, the measured values V41-A to V41-N, the measured values V42-A to V42-N, and measured values that are similarly obtained from the base stations other than the base station 32-X regarding which it is determined whether an abnormality is present (measured values V41-A-1 to V41-N-n and measured values V42-A-1 to V42-N-n). The measured value V31, the measured value V32, the measured values V41-A to V41-N, and the measured values V42-A to V42-N may be excluded from the learning target when the first learning unit 3g performs learning. The first model generator 3h generates the first model from the results of the learning. The calculation unit 3i calculates the estimated value of the first index in the time zone T2 in which it is determined whether an abnormality is present in the base station 32-X regarding which it is determined whether an abnormality is present using the measured values V41-A to V41-N and the first model. The first determination unit 2i compares the estimated value of the first index in the time zone T2 in which it is determined whether an abnormality is present in the base station 32-X regarding which it is determined whether an abnormality is present with the measured value V31 and determines that there is an abnormality in the base station 32-X regarding which it is determined whether an abnormality is present when the result of the comparison does not satisfy the criterion.

Figure 8A:
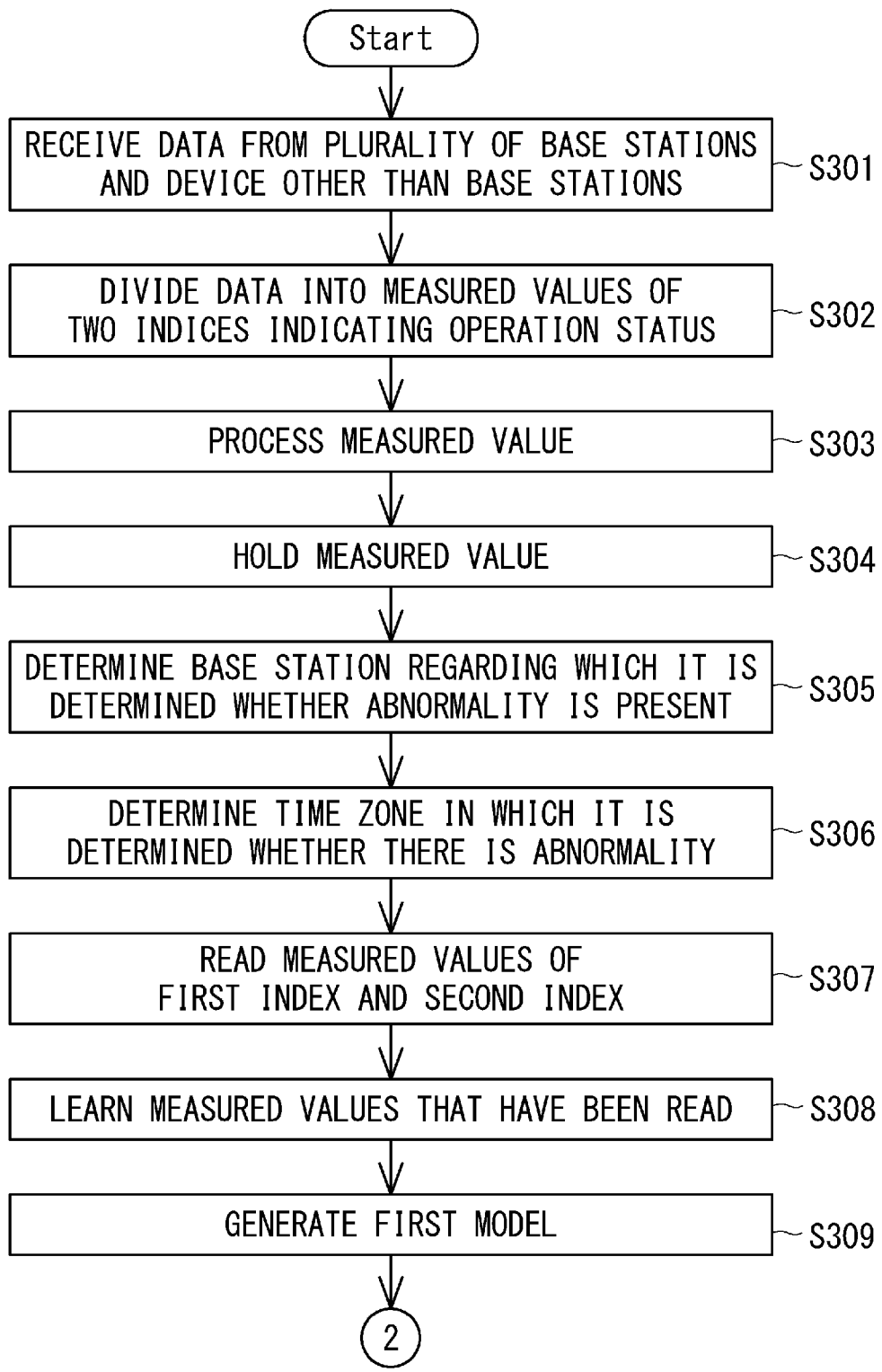
FIG. 8A is a flowchart showing one example of processing of the server according to the third example embodiment.
Figure 8B:
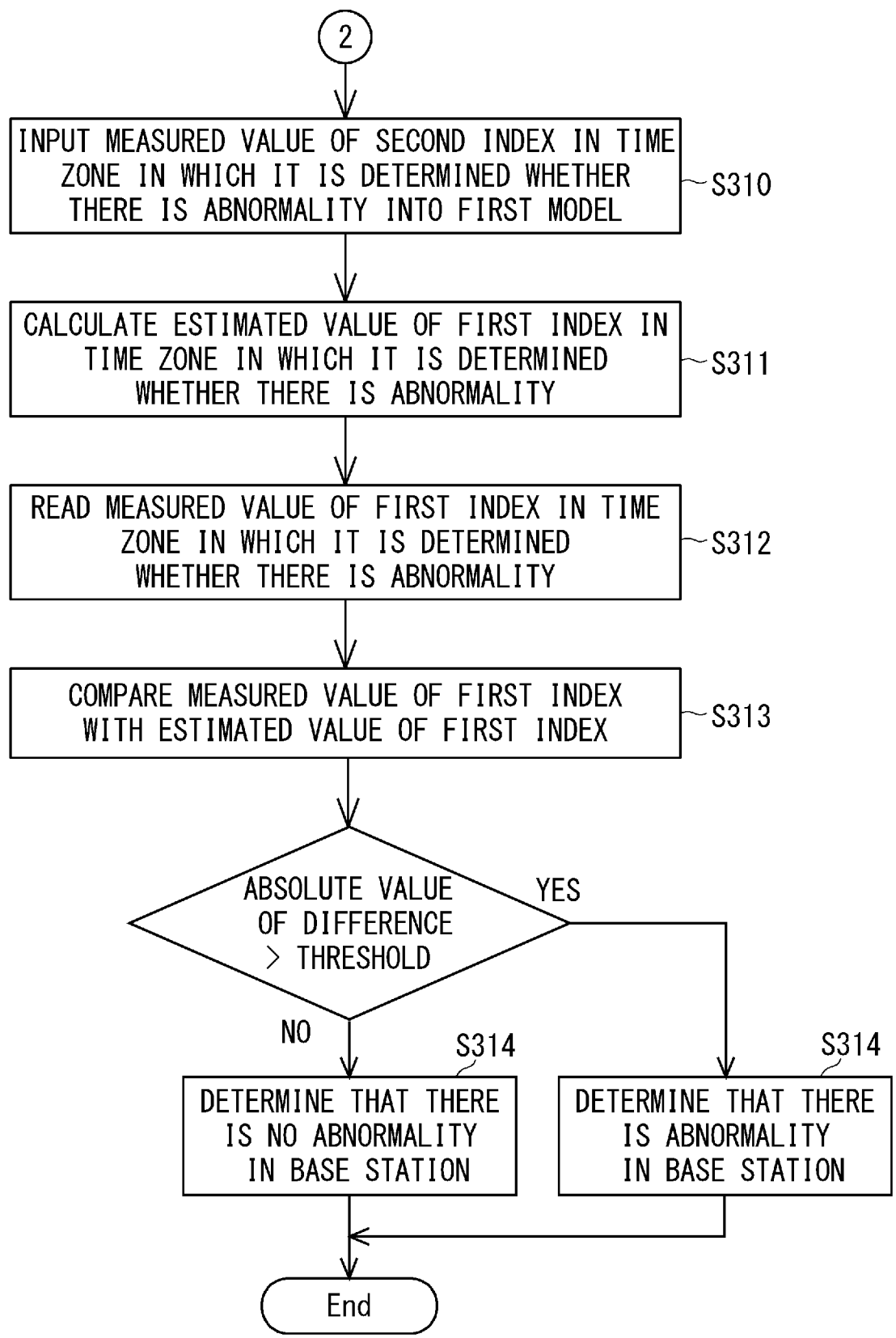
FIG. 8B is a flowchart showing one example of processing of the server according to the third example embodiment.

Referring next to FIGS. 8A and 8B, an operation of the server 31 according to this example embodiment will be described in further detail. FIGS. 8A and 8B are flowcharts showing processing in this example embodiment.

[Step S301] The receiver 3a receives a plurality of types of data from each of the plurality of base stations 32-1 to 32-$n$ and further receives data related to each of the plurality of base stations 32-1 to 32-$n$ from the device 33. The data related to each of the plurality of base stations 32-1 to 32-$n$ is, for example, but not limited to, statistical data etc. regarding the type of an application that users who stay within areas of the respective base stations are using. Further, a method of receiving data includes, but not limited to, a method of constructing a system and automatically receiving the data, or a method of downloading, by a person, data from the device 33 and uploading this data onto the server 31.

[Step S302] The dividing unit 3b divides the data received by the receiver 3a into a measured value of a first index indicating the operation status of each of the plurality of base stations 32-1 to 32-n and a measured value of a second index indicating the operation status of each of the plurality of base stations 32-1 to 32-n. The first index may be, for example, data of the type related to the traffic amount. The data of the type related to the traffic may be, for example, a traffic amount. The first index may also be, but not limited to, an index related to the radio quality such as the RSSI, the propagation loss rate, the bandwidth, the DTX rate, the SINR or the like, the user distribution of the index related to the radio quality, various completion rates (the RRC connection success rate and so on), the uplink throughput, the downlink throughput, the number of users who are present in the areas formed by the plurality of respective base stations 32-1 to 32-n, radio frequencies of the plurality of respective base stations 32-1 to 32-n, specification data of the plurality of respective base stations 32-1 to 32-n, information regarding installation of the plurality of respective base stations 32-1 to 32-n or the like. The information regarding installation of the plurality of respective base stations 32-1 to 32-n may be, for example, but not limited to, positional information of the plurality of respective base stations 32-1 to 32-n, angles of antennas of the plurality of respective base stations 32-1 to 32-n, information on areas covered by the plurality of respective base stations 32-1 to 32-n or the like.

The second index is data of the type for estimating the first index. When, for example, the first index is the traffic amount, the second index is data of the type for estimating the traffic amount. Specifically, the second index in this case may be, but not limited to, an index related to the radio quality such as the RSSI, the propagation loss rate, the bandwidth, the DTX rate, the SINR or the like, the user distribution of the index related to the radio quality, various completion rates (the RRC connection success rate and so on), the uplink throughput, the downlink throughput, the number of users who are present in the areas formed by the plurality of respective base stations 32-1 to 32-n, radio frequencies of the plurality of respective base stations 32-1 to 32-n, specification data of the plurality of respective base stations 32-1 to 32-n, information regarding installation of the plurality of respective base stations 32-1 to 32-n. The information regarding installation of the plurality of respective base stations 32-1 to 32-n may be, for example, but not limited to, positional information of the plurality of respective base stations 32-1 to 32-n, angles of antennas of the plurality of respective base stations 32-1 to 32-n, information on areas covered by the plurality of respective base stations 32-1 to 32-n or the like. Further, when, for example, the first index is the SINR, the second index is data of the type for estimating the SINR. Specifically, the second index in this case is, but not limited to, an index related to the radio quality such as the RSSI, the propagation loss rate, the bandwidth, the DTX rate and the like, the user distribution of the index related to the radio quality, various completion rates (the RRC connection success rate and so on), the traffic amount, the uplink throughput, the downlink throughput, the number of users who are present in the areas formed by the plurality of respective base stations 32-1 to 32-n, radio frequencies of the plurality of respective base stations 32-1 to 32-n, specification data of the plurality of respective base stations 32-1 to 32-n, information regarding installation of the plurality of respective base stations 32-1 to 32-n or the like. The information regarding installation of the plurality of respective base stations 32-1 to 32-n may be, for example, but not limited to, positional information of the plurality of respective base stations 32-1 to 32-n, angles of antennas of the plurality of respective base stations 32-1 to 32-n, information on areas covered by the plurality of respective base stations 32-1 to 32-n or the like.

[Step S303] The processing unit 3c performs appropriate processing on the divided data. The divided data includes data fixed in each of the plurality of base stations 32-1 to 32-n or data having a format of time series in which a change over time of the data is recorded. Appropriate processing may be performed on data having a format of time series since units of time axis may vary in this data. The appropriate processing includes combination/division of data having a format of time series, exclusion of an abnormal value, average value/maximum value processing with a defined section. Further, new type of data may be defined and it may be added to the type included in the second index. For example, the following type of data may be defined and it may be added to the type included in the second index.

$$\text{Number of users normalized by bandwidth} = \frac{\text{Number of users}}{\text{Bandwidth}}$$

The aforementioned type of data is an example in which the knowledge that even when the number of users is constant, the degree of congestion varies if the bandwidth differs is converted into data and defined. As described above, the processing unit 3c may define a new type of data and add it to the type included in the second index.

[Step S304] The storage unit 3d stores the measured value of the first index and the measured value of the second index in the storage unit 3d in the server.

[Step S305] The base station determination unit 3e determines the base station 32-X regarding which it is determined whether an abnormality is present among the plurality of base stations 32-1 to 32-n. The base station determination unit 3e may specify one base station regarding which it is determined whether an abnormality is present or may specify a plurality of base stations.

[Step S306] The time zone determination unit 3f determines a time zone in which it is determined whether an abnormality is present in the base station 32-X regarding which it is determined whether an abnormality is present. The time zone in which it is determined whether an abnormality is present may either be a specific time zone only or be a plurality of time zones. Further, the length of the time zone that is set may be a few minutes when it is set short and may be a few months when it is set long.

[Step S307] The first learning unit 3g reads the measured value V31, the measured value V32, the measured values V41-A to V41-N, the measured values V42-A to V42-N, and measured values similarly obtained from the base stations other than the base station 32-X regarding which it is determined whether an abnormality is present from the storage unit 3d as the training data.

[Step S308] The first learning unit 3g learns the relation among the measured values using the training data and the machine learning algorithm. The machine learning algorithm used in this example embodiment may be an existing machine learning algorithm or may be a machine learning algorithm that will be developed in the future. For example, a machine learning algorithm such as a linear regression or a neural network may be used. Further, in this example embodiment, the measured values except for the measured value V31 and the measured values V41-A to V41-N may be used as the training data. By not using the data in the time zone T2 in which it is determined whether an abnormality is present in the base station 32-X regarding which it is determined whether an abnormality is present for the learning, it can be expected that the effect of improving the reliability of the first model will be obtained. Further, in this example embodiment, the measured values except for the measured value V31, the measured value V32, the measured values V41-A to V41-N, and the measured values V42-A to V42-N may be used as the training data. By not using the data of the base station 32-X regarding which it is determined whether an abnormality is present for learning, it can be expected that the reliability of the first model will be further improved.

[Step S309] The first model generator 3h generates a first model indicating the relation between the measured value of the first index and the measured value of the second index from the results of the learning. The first model according to this example embodiment is a model expression that can express the objective variable by explanatory variables of one or more types using the measured value of the first index as the objective variable and the measured value of the second index as the explanatory variable. Expression 3 is one example of the first model when the throughput is used as the objective variable and the SINR, the bandwidth, and the number of users are used as the explanatory variables. Further, Expression 4 is one example of the first model when the SINR is used as the objective variable, and the RSSI and the propagation loss rate are used as the explanatory variables.

$$\text{Throughput} = 0.3 * SINR + 0.5 * \frac{\text{Bandwidth}}{\text{Number of users}} \quad \text{[Expression 3]}$$

$$SINR = 1.2 * RSSI - 1.3 * \text{Propagation loss rate} \quad \text{[Expression 4]}$$

As described above, the first model generator 3h generates the model expression that can express the objective variable by the explanatory variable. The type of the model expression in the first model used in this example embodiment may either be an existing type or any type that will be developed in the future. As a matter of course, it is sufficient that the objective variable be the first index and is not limited to the throughput or the SINR. Likewise, it is sufficient that the explanatory variable be the second index and is not limited to the SINR, the bandwidth, the number of users, or the propagation loss rate. When the traffic amount is used as the objective variable, the first model generator 3h may use data of the type related to the traffic amount and data of the type for estimating the traffic amount as the explanatory variables. By using the data of the type related to the traffic amount and data of the type for estimating the traffic amount for generating the first model, the effect of improving the accuracy of the first model generated by the first model generator 3h will be obtained. Further, the first model generator 3h may use information regarding installation of the base station for generating the first model. By using the information regarding installation of the base station for generating the first model, the effect of improving the accuracy of the first model generated by the first model generator 3h will be obtained.

[Step S310] The calculation unit 3i inputs the measured values V41-A to V41-N into the first model.

[Step S311] The calculation unit 3i calculates the estimated value of the first index in the time zone T2 in which it is determined whether an abnormality is present. Consider a case, for example, in which it is desired to estimate the traffic amount in the time zone T2 in which it is determined whether an abnormality is present in the base station 32-X regarding which it is determined whether an abnormality is present. The calculation unit 3i inputs, in accordance with the model expression of the first model in which the traffic amount is used as the objective variable, the necessary explanatory variable into the first model, and calculates the traffic amount in the time zone T2 in which it is determined whether an abnormality is present in the base station 32-X regarding which it is determined whether an abnormality is present.

[Step S312] The first determination unit 3j reads the measured value V31 from the storage unit 3d.

[Step S313] The first determination unit 3j compares the measured value V31 with the estimated value of the first index in the time zone T2 in which it is determined whether an abnormality is present in the base station 32-X regarding which it is determined whether an abnormality is present, the estimated value of the first index being calculated in [Step S311]. The method of the comparison may be performed by calculating, for example, the absolute value of the difference between the estimated value and the measured value. Further, the ratio of the measured value with respect to the estimated value may be calculated or the ratio of the estimated value with respect to the measured value may be calculated.

[Step S314] The first determination unit 3j determines that there is no abnormality in the base station 32-X regarding which it is determined whether an abnormality is present when the result of the comparison satisfies the criterion. When the result of the comparison does not satisfy the criterion, the first determination unit 3j determines that there is an abnormality in the base station 32-X regarding which it is determined whether an abnormality is present. When the determination is made, for example, the first determination unit 3j may determine that there is an abnormality when the absolute value of the difference between the estimated value and the measured value has exceeded the predetermined threshold. Further, the first determination unit 3j may determine that there is an abnormality when the ratio of the measured value with respect to the estimated value is below the threshold or may determine that there is an abnormality when the ratio of the estimated value with respect to the measured value exceeds the threshold.

As described above, the server 31 generates the first model using the plurality of types of data received from each of the plurality of base stations 32-1 to 32-n and the data related to each of the plurality of base stations 32-1 to 32-n received from the device 33 and compares the estimated value of the first index of the base station 32-X regarding which it is determined whether an abnormality is present, the estimated value of the first index being calculated using the first model, with the measured value V31, thereby determining whether there is an abnormality. According to this example embodiment, the server 31 is able to receive the data related to the base station not only from the plurality of base stations 32-1 to 32-n but also from the device 33. Accordingly, the first model can be generated using more pieces of data. Therefore, it is possible to generate the first model capable of calculating the more accurate estimated value in a shorter period of time. Further, by not using a part or all of the data of the base station 32-X regarding which it is determined whether an abnormality is present for generating the first model, the reliability of the first model can be improved.

Fourth Example Embodiment

Figure 9:
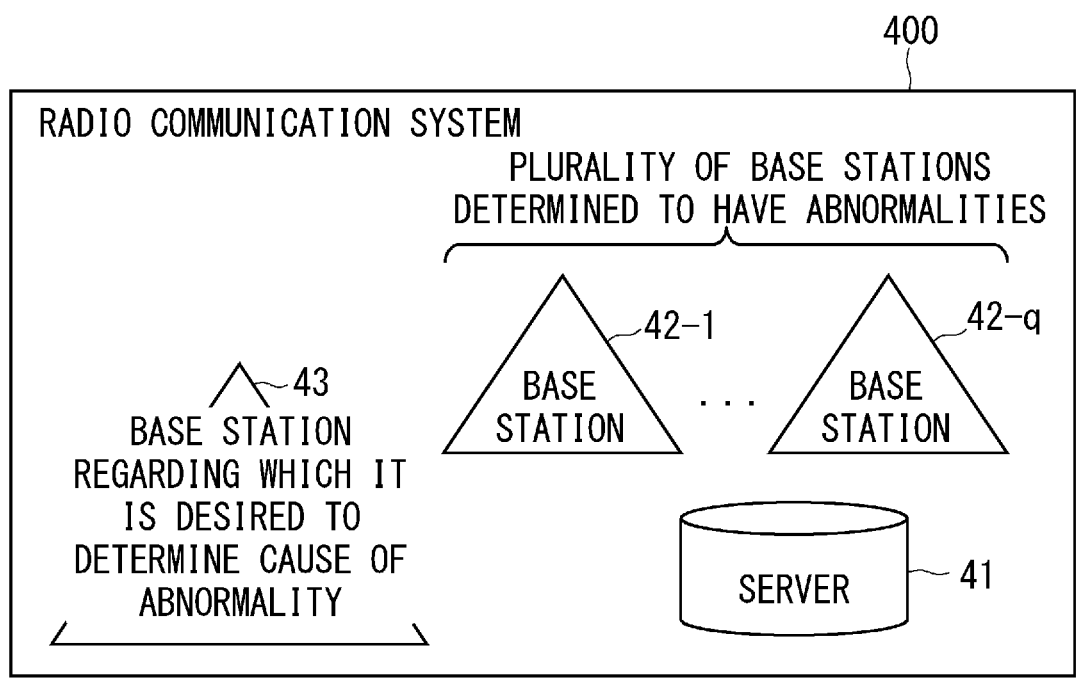
FIG. 9 is a diagram showing one example of a radio communication system according to a fourth example embodiment.
Figure 10:
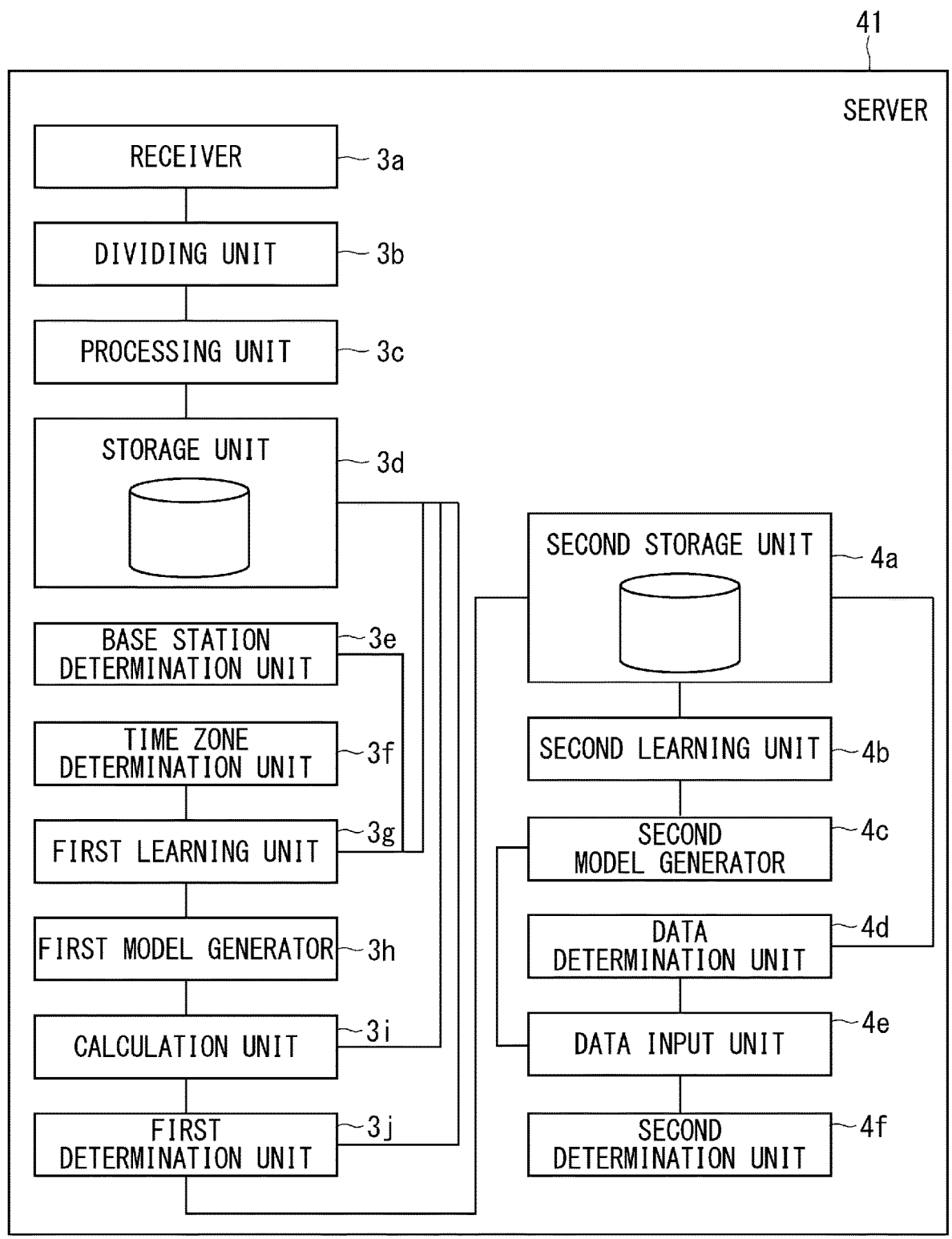
FIG. 10 is a block diagram showing one example of a configuration of a server according to the fourth example embodiment.

Next, a fourth example embodiment will be described. This example embodiment is executed after the disclosure described in the above-described first to third example embodiments is executed. In the first to third example embodiments, it can only be determined that there is an abnormality in a base station. This example embodiment further enables to determine the cause of the abnormality in the base station. FIG. 9 shows one example of a radio communication system 400 according to this example embodiment. The radio communication system 400 includes a server 41, a plurality of base stations 42-1 to 42-q whose causes of abnormalities have become clear, and a base station 43 regarding which it is desired to determine the cause of the abnormality. FIG. 10 shows one example of the server 41. The server 41 shown in FIG. 10 is an example in which this example embodiment is executed after the disclosure described in the third example embodiment is executed. The server 41 includes a second storage unit 4a, a second learning unit 4b, a second model generator 4c, a data determination unit 4d, a data input unit 4e, and a second determination unit 4f. Further, the server 41 may include a labeling unit 4g. The disclosure according to this example embodiment may be performed solely.

Table 3 is a table in which measured values and estimated values of the plurality of types of data received from the plurality of base stations 42-1 to 42-q and the base station 43 are associated with causes of abnormalities.

This example embodiment will be described with reference to Table 3. The second storage unit 4a stores the measured values and the estimated values of the plurality of types of data received from the base station 43, and the plurality of base stations 42-1 to 42-q that have been determined to have abnormalities. The operator of the server 41 labels the measured values and the estimated values of the plurality of types of data received from the plurality of base stations 42-1 to 42-q that have been determined to have abnormalities, the measured values and the estimated values being stored in the second storage unit 4a, with the cause of the abnormality for each of the base stations. For example, the operator puts a label indicating that the cause of the abnormality is an antenna on the measured values and the estimated values of the plurality of types of data such as the measured value 11 whose type is the traffic amount and the estimated value 12 whose type is the traffic amount in the base station 42-1. The estimated value may be calculated when the disclosure described in the above-described first to third example embodiments is executed. Each of the pieces of data after the labeling is, for example, as shown in Table 3. Note that q, r, and s in Table 3 are natural numbers. The measured values and the estimated values of the plurality of types of data may be, for example, but not limited to, measured values and estimated values of the index related to the radio quality such as the traffic amount, the RSSI, the propagation loss rate, the bandwidth, the DTX rate, the SINR or the like, the user distribution of the index related to the radio quality, various completion rates (the RRC connection success rate and so on), the uplink throughput, the downlink throughput or the like.

TABLE 3

| | Base station | | | |
|---|---|---|---|---|
| Type | Base station 42-1 | Base station 42-2 | ... Base station 42-q | Base station 43 |
| Traffic amount | Measured value 11 | Measured value 21 | ... Measured value q1 | Measured value 1 |
| | Estimated value 12 | Estimated value 22 | ... Estimated value q2 | Estimated value 2 |
| RSSI | Measured value 13 | Measured value 23 | ... Measured value q3 | Measured value 3 |
| | Estimated value 14 | Estimated value 24 | ... Estimated value q4 | Estimated value 4 |
| ... | ... | ... | ... ... | ... |
| Propagation loss rate | Measured value 1r | Measured value 2r | ... Measured value qr | Measured value r |
| | Estimated value 1s | Estimated value 2s | ... Estimated value qs | Estimated value s |
| Label of cause of abnormality | Antenna | Software | ... Antenna | (None) |

The second learning unit 4b reads the measured values and the estimated values of the plurality of types of labeled data regarding the plurality of base stations 42-1 to 42-q from the second storage unit 4a and calculates the consistency between the measured value and the estimated value for each type of data. The second learning unit 4b may read, for example, the measured values and the estimated values of the plurality of types of data in the base station 42-1 from the second storage unit 4a and calculate the consistency between the measured value 11 and the estimated value 12 and the consistency between the measured value 13 and the estimated value 14 in Table 3. The second learning unit 4b learns the relation between the consistency for each type of data and the cause of the abnormality. The second model generator 4c generates a second model based on the results of learning by the second learning unit 4b. The data determination unit 4d determines the measured values and the estimated values of the plurality of types of data received from the base station 43 among the data stored in the second storage unit 4a as data for determining the cause of the abnormality. The data input unit 4e inputs the measured values and the estimated values of the plurality of types of data in the base station 43 determined in the data determination unit 4d into the second model. The second determination unit 4f determines the cause of the abnormality in the base station 43 using the data that the data input unit 4e has input and the second model. The labeling unit 4g labels the data determined by the data determination unit 4d with the real cause of the abnormality in the base station 43 found in an actual inspection or the like.

The operation of the second learning unit 4b will be described in further detail. The second learning unit 4b calculates the consistency between the estimated value and the measured value of the data of each type in the base stations 42-1 to 42-q. Then the second learning unit 4b learns the consistency of the data of each type and the labeled cause of the abnormality and generates a rule.

The second learning unit 4b may calculate, for example, x as shown in Expression 5, and generate a rule that there is an abnormality in the antenna when 0<x<1 and there is an abnormality in the software when 1<x<2. The symbols a, b, and c are constant numbers.

$$a*\text{RSSI(Consistency)}+b*\text{RRC connection success rate(Consistency)}+c*\text{Propagation loss rate(Consistency)}=x \quad \text{[Expression 5]}$$

As shown in Expressions 6, 7, and 8, the second learning unit 4b may calculate $x_1$, $x_2$, and $x_3$ and generate a rule from the magnitude of the respective numbers of $x_1$, $x_2$, and $x_3$. The symbols a, b, and c are constant numbers.

$$a*\text{RSSI(Consistency)}+b*\text{RRC connection success rate(Consistency)}=x_1 \quad \text{[Expression 6]}$$

$$b*\text{RC connection success rate(Consistency)}+c*\text{Propagation loss rate(Consistency)}=x_2 \quad \text{[Expression 7]}$$

$$a*\text{RSSI(Consistency)}+c*\text{Propagation loss rate(Consistency)}=x_3 \quad \text{[Expression 8]}$$

The second learning unit 4b may divide the consistency into three stages and generate a rule from the consistency in the data of each type of the plurality of base stations 42-1 to 42-q and the cause of the abnormality. The second learning unit 4b divides, for example, the consistency into three stages of ○, Δ, and x in a descending order of the consistency level and generates a table as shown in Table 4 from the measured values and the estimated values of the plurality of types of data in the plurality of base stations 42-1 to 42-q.

Table 4 is a table in which the consistency of the measured values and the estimated values of the plurality of types of data received from the plurality of base stations 42-1 to 42-q and the base station 43 is associated with the cause of the abnormality. Note that q is a natural number. As a matter of course, the consistency may be divided into a plurality of desired stages. Further, the second learning unit 4b may generate a rule that the cause of the abnormality is an antenna when the consistency of the RSSI is ○ and the propagation loss rate is x.

TABLE 4

| Type | Base station 42-1 | Base station 42-2 | ... | Base station 42-q | Base station 43 |
|---|---|---|---|---|---|
| Traffic amount | ○ | x | ... | ○ | ○ |
| RSSI | ○ | Δ | ... | x | Δ |
| ... | ... | ... | ... | ... | ... |
| Propagation loss rate | x | x | ... | x | x |
| Label of cause of abnormality | Antenna | Software | ... | Antenna | (None) |

Further, the server 41 may determine the cause of the abnormality in the time zone in which the cause of the abnormality in the base station 43 has not been found using the measured values and the estimated values of the plurality of types of data in the plurality of time zones on which the cause of the abnormality in the base station 43 is labeled and the second model. As one example, with reference to Table 5, an operation of the server 41 will be described. Table 5 is a table in which the measured values and the estimated values in the plurality of types of data are associated with the cause of the abnormality in the plurality of time zones T1 to Tz of the base station 43. The symbols q, r, s, and z are natural numbers. The measured values and the estimated values of the plurality of types of data are, for example, but not limited to, the index related to the radio quality such as the traffic amount, the RSSI, the propagation loss rate, the bandwidth, the DTX rate, the SINR or the like, the user distribution of the index related to the radio quality, various completion rates (the RRC connection success rate and so on), the uplink throughput, the downlink throughput or the like.

TABLE 5

| Type | Time zone T1 | Time zone T2 | ... | Time zone Tq | Time zone Tz |
|---|---|---|---|---|---|
| Traffic amount | Measured value W11 | Measured value W21 | ... | Measured value Wq1 | Measured value W1 |
| | Estimated value W12 | Estimated value W22 | ... | Estimated value Wq2 | Estimated value W2 |
| RSSI | Measured value W13 | Measured value W23 | ... | Measured value Wq3 | Measured value W3 |
| | Estimated value W14 | Estimated value W24 | ... | Estimated value Wq4 | Estimated value W4 |
| ... | ... | ... | ... | ... | ... |
| Propagation loss rate | Measured value W1r | Measured value W2r | ... | Measured value Wqr | Measured value Wr |
| | Estimated value W1s | Estimated value W2s | ... | Estimated value Wqs | Estimated value Ws |
| Label of cause of abnormality | Antenna | Software | ... | Antenna | (None) |

The second storage unit 4a stores the measured values and the estimated values of the plurality of types of data in a plurality of time zones for the base station 43. The operator of the server 41 labels the measured values of the measured values and the estimated values of the plurality of types of data in the time zone T1 to time zone Tq in which an abnormality has occurred in the base station 43, and the estimated values of the measured values and the estimated values of the plurality of types of data in the time zone T1 to time zone Tq in which an abnormality has occurred in the base station 43, the measured values and the estimated values being stored in the second storage unit 4a, with the cause of the abnormality. The operator puts a label indicating that the cause of the abnormality is an antenna on, for example, the measured values and the estimated values of the plurality of types of data such as the measured value W11 of the traffic amount and the estimated value W12 of the traffic amount in the time zone T1 in which it has been determined that there is an abnormality. The respective pieces of data after the labeling are, for example, as shown in Table 5. The estimated values may be calculated when the disclosure described in the above-described first to third example embodiments is executed. The second learning unit 4b reads the measured values and the estimated values of the plurality of types of labeled data from the second storage unit 4a and calculates the consistency between the measured value and the estimated value for each type of data. As a matter of course, the consistency between the measured values and the estimated values may be calculated for a plurality of types. For example, the consistency between the measured value W11 and the estimated value W12 and the consistency between the measured value W13 and the estimated value W14 in Table 5 may be calculated. The second learning unit 4b learns the relation between the consistency for each type of data and the cause of the abnormality. The second model generator 4c generates the second model based on the results of the learning by the second learning unit 4b. The data determination unit 4d determines that the cause of the abnormality is determined for the data in the time zone in which the cause of the abnormality has not been determined in the data received from the base station 43 among the data stored in the second storage unit 4a. The data determination unit 4d may determine, for example, that it determines the cause of the abnormality for the measured values and the estimated values of the plurality of types of data in the time zone Tz in Table 5. The data input unit 4e inputs the measured values and the estimated values of the plurality of types of data in the time zone determined in the data determination unit 4d into the second model. The second determination unit 4f determines the cause of the abnormality in the time zone in which the cause of the abnormality in the base station 43 has not been determined using the data that the data input unit 4e has input and the second model. The labeling unit 4g labels the data determined by the data determination unit 4d with the real cause of the abnormality in the base station 43 found in an actual inspection or the like.

The second learning unit 4b may calculate the consistency between the estimated value and the measured value of the data of each type using data in the plurality of time zones T1 to Tz on which the cause of the abnormality in the base station 43 is labeled, learn the consistency of the data of each type and the cause of the abnormality that has been labeled, and find a rule.

The second learning unit 4b may calculate the consistency between the estimated value and the measured value of the data of each type using the data in the plurality of time zones T1 to Tz on which the cause of the abnormality in the base station 43 is labeled, learn the consistency of the data of each type and the cause of the abnormality that has been labeled, and generate a rule.

The second learning unit 4b may calculate, for example, x as shown in Expression 9 and generate a rule that it is determined that there is an abnormality in the antenna when 0<x<1 and that there is an abnormality in the software when 1<x<2. Note that a, b, and c are constant numbers.

$$a*\text{RSSI(Consistency)}+b*\text{RRC connection success rate(Consistency)}+c*\text{Propagation loss rate(Consistency)}=x \qquad \text{[Expression 9]}$$

As shown in Expressions 10, 11, and 12, the second learning unit 4b may calculate $x_1$, $x_2$, $x_3$ and generate a rule from the magnitude of the respective numbers of x1, x2, and x3.

$$a*\text{RSSI(Consistency)}+b*\text{RRC connection success rate(Consistency)}=x_1 \qquad \text{[Expression 10]}$$

$$b*\text{RRC connection success rate(Consistency)}+c*\text{Propagation loss rate(Consistency)}=x_2 \qquad \text{[Expression 11]}$$

$$a*\text{RSSI(Consistency)}+c*\text{Propagation loss rate(Consistency)}=x_3 \qquad \text{[Expression 12]}$$

Further, the second learning unit 4b divides, for example, the consistency into three stages of ○, Δ, and x in a descending order of the consistency level, and generates a table as shown in Table 6 from the measured values and the estimated values of the plurality of types of data in the time zones T1 to Tq in which an abnormality has occurred in the base station 43. Table 6 is a table in which the consistency of the measured values and the estimated values of the plurality of types of data in the plurality of time zones T1 to Tz is associated with the cause of the abnormality. The symbols q and z are natural numbers. As a matter of course, the consistency may be divided into a plurality of desired stages. The second learning unit 4b may generate a rule that the cause of the abnormality is an antenna when, for example, the consistency of the RSSI is ○ and the propagation loss rate is x from the results shown in Table 6.

TABLE 6

| Type | Time zone T1 | Time zone T2 | ... | Time zone Tq | Time zone Tz |
|---|---|---|---|---|---|
| Traffic amount | ○ | x | ... | ○ | ○ |
| RSSI | ○ | Δ | ... | x | Δ |
| ... | ... | ... | ... | ... | ... |
| Propagation loss rate | x | x | ... | x | x |
| Label of cause of abnormality | Antenna | Software | ... | Antenna | (None) |

Figure 11:
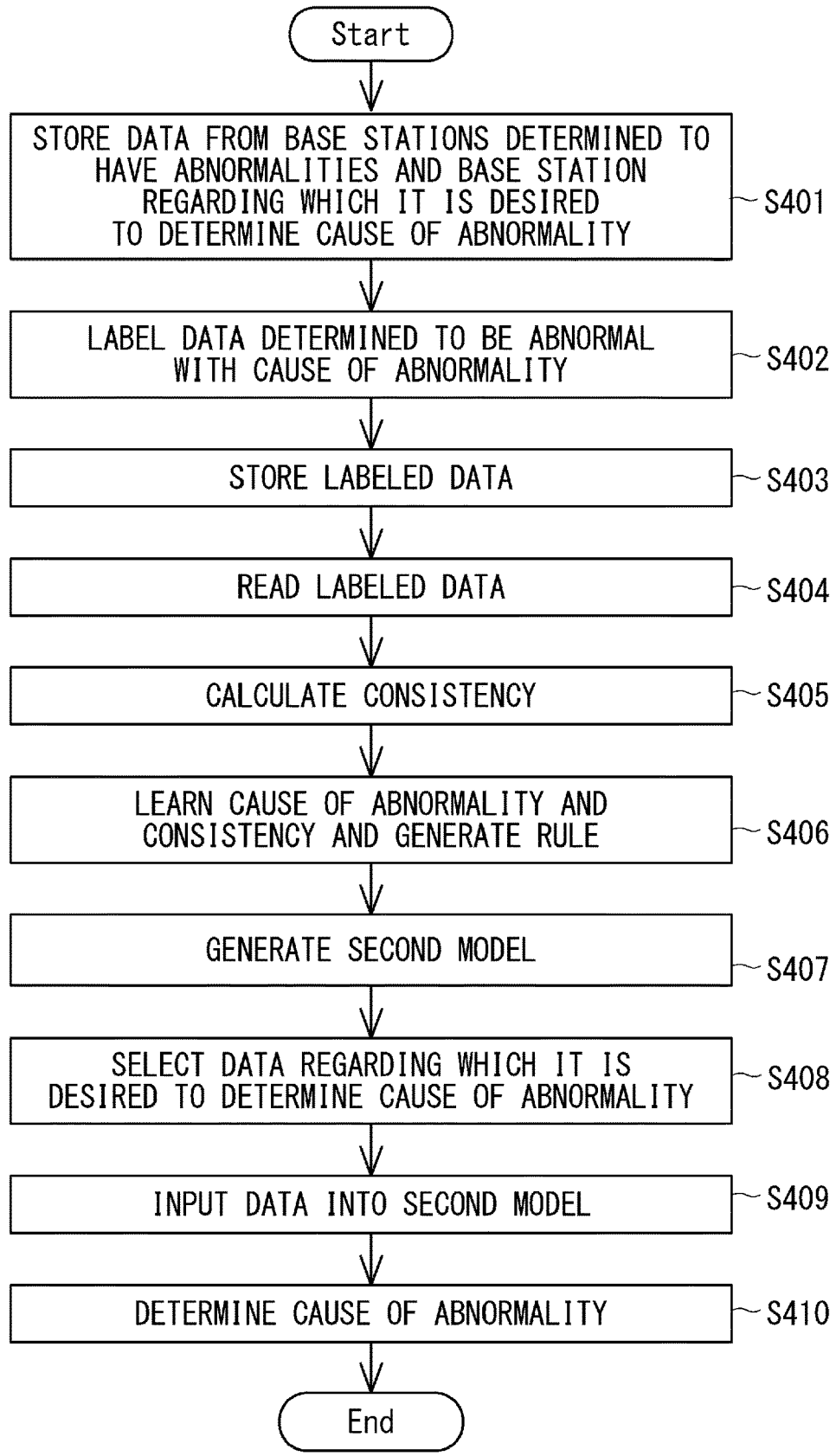
FIG. 11 is a flowchart showing one example of processing of the server according to the fourth example embodiment.

Referring next to FIG. 11, an operation of the server 41 according to this example embodiment will be described in further detail. FIG. 10 is a flowchart showing processing in this example embodiment.

[Step S401] The second storage unit 4a stores measured values and estimated values received from the base station 43, and the plurality of base stations 42-1 to 42-q that have been determined to have abnormalities. Further, the second storage unit 4a may store the measured values and the estimated values of the plurality of types of data in the plurality of time zones in the base station 43 and the plurality of base stations 42-1 to 42-q.

[Step S402] The operator of the server 41 labels the measured values and the estimated values in the measured values and the estimated values of the plurality of types of data received from the plurality of base stations 42-1 to 42-q, the measured values and the estimated values being stored in the second storage unit 4a, with the cause of the abnormality for each base station. The operator of the server 41, for example, may put a label indicating that the cause of the abnormality is an antenna on the measured values and the estimated values of the plurality of types of data such as the measured value 11 of the traffic amount and the estimated value 12 of the traffic amount in Table 3. The respective pieces of data after the labeling are, for example, as shown in Table 3. Further, the operator of the server 41 may label the measured values and the estimated values of the plurality of types of data in the time zones T1 to Tq in which an abnormality has occurred in the base station 43 regarding which it is desired to determine the cause of the abnormality, the measured values and the estimated values being stored in the second storage unit 4a, with the cause of the abnormality. The operator, for example, may put a label indicating that the cause of the abnormality is an antenna on the measured values and the estimated values of the plurality of types of data such as the measured value W11 of the traffic amount and the estimated value W12 of the traffic amount in Table 4. The respective pieces of data after the labeling are, for example, as shown in Table 4. The cause of the abnormality may be, for example, the name of each hardware like an antenna, the cause of the failure of each hardware, or the name of the software that controls the base station.

[Step S403] The second storage unit 4a stores the measured values and the estimated values of the plurality of types of data labeled with the cause of the abnormality in the second storage unit 4a.

[Step S404] The second learning unit 4b reads the measured values and the estimated values of the plurality of types of labeled data from the second storage unit 4a. The measured values and the estimated values of the plurality of types of data to be read may be values obtained from the plurality of base stations 42-1 to 42-q or may be a combination of data in different time zones in one base station 43.

[Step S405] The second learning unit 4b calculates the consistency between the measured value and the estimated value from the measured value and the estimated value of each type included in the measured values and the estimated values of the plurality of types of data. The data of each type is, for example, but not limited to, the index related to the radio quality such as the traffic amount, the RSSI, the propagation loss rate, the bandwidth, the DTX rate, the SINR or the like, the user distribution of the index related to the radio quality, various completion rates (the RRC connection success rate and so on), the uplink throughput, the downlink throughput or the like. Further, the consistency may be calculated from the absolute value of the difference between the estimated value and the measured value, the ratio of the measured value with respect to the estimated value, the ratio of the estimated value with respect to the measured value or the like.

[Step S406] The second learning unit 4b learns a combination of the plurality of consistencies calculated for each data of each type and the cause of the abnormality that has been labeled using the machine learning algorithm to generate a rule. Further, the second learning unit 4b may divide the calculated consistency into desired stages and learn the relation between the stage that corresponds to the consistency of data of each type and the cause of the abnormality using the machine learning algorithm, thereby generating a rule. The machine learning algorithm used in this example embodiment may be an existing machine learning algorithm or may be a machine learning algorithm that will be developed in the future. The machine learning algorithm such as a linear regression or a neural network may be, for example, used.

[Step S407] The second model generator 4c generates a second model from the results of the learning. The second model in this example embodiment is a model with which the cause of the abnormality can be determined from the consistency in the measured values and the estimated values of the plurality of types of data.

[Step S408] The data selection unit 4e selects, as data that is used to determine the cause of the abnormality, the measured values and the estimated values of the plurality of types of data that are not labeled with the cause of the abnormality from among the data stored in the second storage unit 4a.

[Step S409] The data input unit 4e inputs the measured values and the estimated values of the plurality of types of data selected by the data selection unit 4e into the second model generated by the second model generator 4c.

[Step S410] The second determination unit 4f determines the cause of the abnormality in the base station 43 using the second model and the data determined by the data determination unit 4d. The number of causes to be determined may be either one or plural.

Further, the server 41 may include a labeling unit 4g. The labeling unit 4g uses, for example, the cause of the abnormality that has been actually investigated and confirmed in accordance with the recovery of the base station that has been determined to have an abnormality. The labeling unit 4g puts a label on the measured values and the estimated values of the plurality of types of data that have been acquired from the base station and have been determined to be abnormal, determining that the cause of the abnormality found in the investigation is the real cause of the abnormality. Further, the second model generator 4c may update the second model using, besides the measured values and the estimated values of the plurality of types of labeled data that have already been stored in the second storage unit 4a, the measured values and the estimated values of the plurality of types of data newly labeled by the labeling unit 4g. Accordingly, the server 41 is able to determine the cause of the abnormality more accurately.

As described above, the server 41 learns the relation between the cause of the abnormality and the measured values and the estimated values of the plurality of types of data using the measured values and the estimated values of the plurality of types of data labeled with the cause of the abnormality, thereby generating the second model. Thus, the server 41 is able to determine the cause of the abnormality for the measured values and the estimated values of the plurality of types of data that have not been labeled with the cause of the abnormality, which causes the base station that is determined to have an abnormality to be recovered at an early timing.

Fifth Example Embodiment

Figure 12:
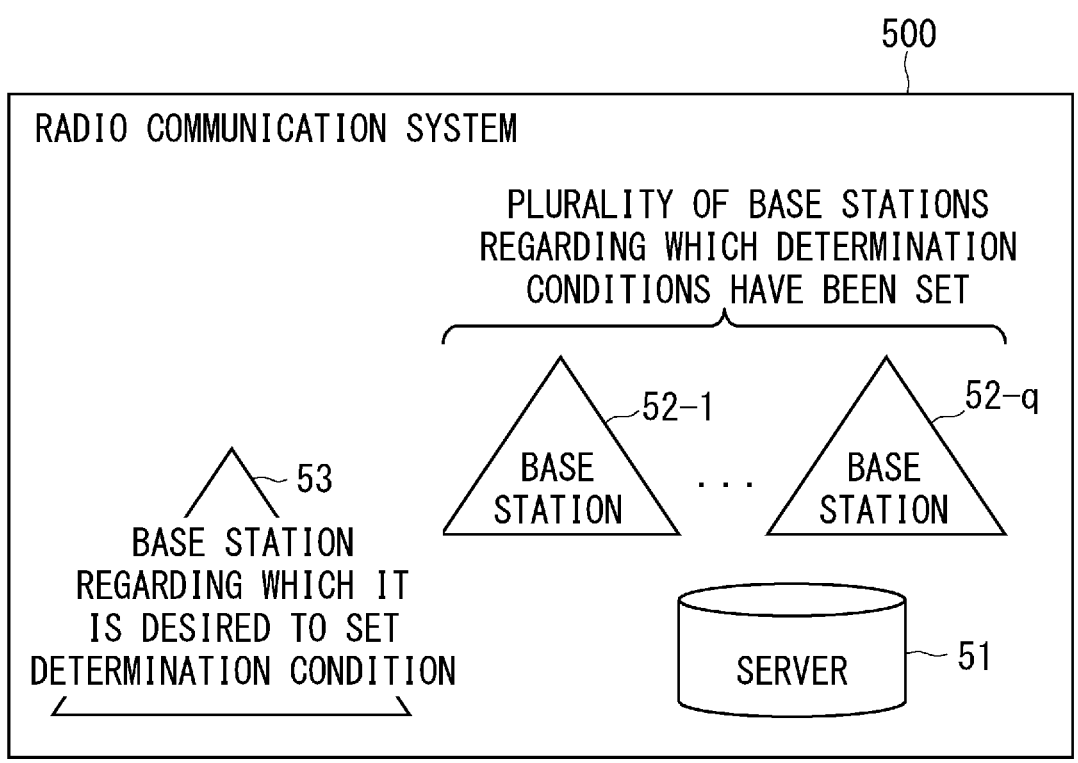
FIG. 12 is a diagram showing one example of a radio communication system according to a fifth example embodiment.
Figure 13:
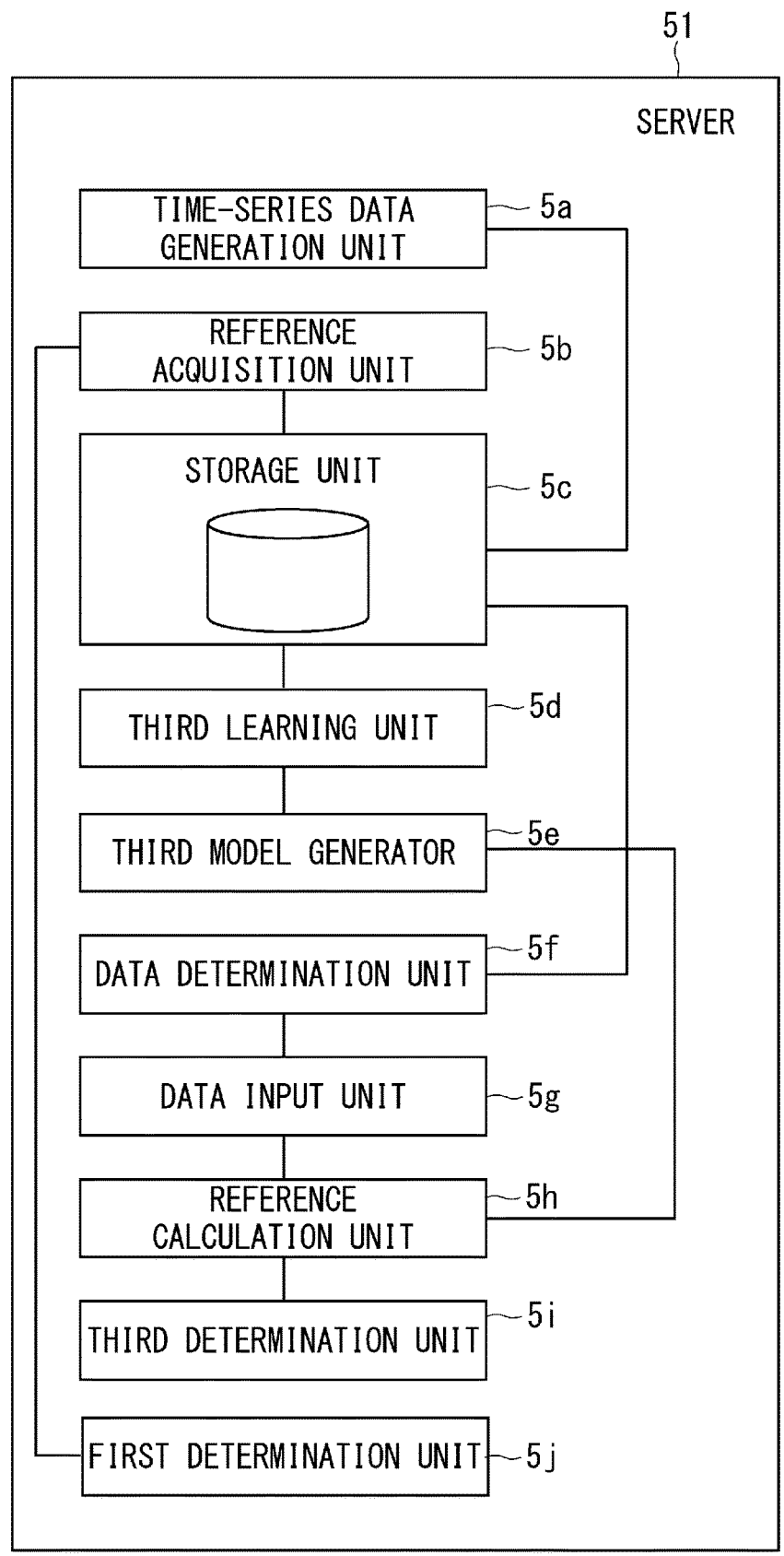
FIG. 13 is a block diagram showing one example of a configuration of a server according to the fifth example embodiment.

Next, a fifth example embodiment will be described. In this example embodiment, the determination condition set by the operator for the base station in the above-described first to third example embodiments is learnt by a server and the server automatically sets the determination condition. Accordingly, the determination condition can be automatically set for a base station regarding which the determination condition has not yet been set by the operator, which allows the server to perform operations from data collection to automatic determination of abnormality. FIG. 12 shows one example of a radio communication system 500 according to this example embodiment. The radio communication system 500 includes a server 51, a plurality of base stations 52-1 to 52-q regarding which determination conditions have been set, and a base station 53 regarding which it is desired to set the determination condition. FIG. 13 shows one example of the server 51. The server 51 includes a time-series data generation unit 5a, a reference acquisition unit 5b, a storage unit 5c, a third learning unit 5d, a third model generator 5e, a data determination unit 5f, a data input unit 5g, a reference calculation unit 5h, a third determination unit 5i, and a first determination unit 5j. Note that the first determination unit 5j has a configuration similar to the configurations of the first determination unit 1d in the first example embodiment, the first determination unit 2i in the second example embodiment, and the first determination unit 3j in the third example embodiment.

With reference to FIG. 13, the third determination unit 5a will be described. The time-series data generation unit 5a acquires a measured value of a first index indicating the operation status of the base station and an estimated value of the first index indicating the operation status of the base station in each of the plurality of base stations 52-1 to 52-q, and the base station 53 from the first determination unit 5j, thereby generating the time-series data for each of the base stations. The first index indicating the operation status of the base station may be, for example, but not limited to, the traffic amount. The first index may also be the index related to the radio quality such as the RSSI, the propagation loss rate, the bandwidth, the DTX rate, the SINR or the like, the user distribution of the index related to the radio quality, various completion rates (the RRC connection success rate and so on), the uplink throughput, the downlink throughput, the number of users who are present in the areas formed by the plurality of respective base stations 52-1 to 52-q and the like.

base station. Further, the difference between them changes with time, and when, in particular, an abnormality has occurred in the base station, it is considered that the difference between the measured value and the estimated value increases. Therefore, the operator sets the determination condition for determining an abnormality for each base station, and a reference value therefor. In order to set the reference value, data of a change over time of the measured value and the estimated value is required. The time-series data in this example embodiment is data in which the measured value of the first index and the change over time in the estimated value of the first index are recorded.

The reference acquisition unit 5b acquires determination conditions set for the plurality of respective base stations 52-1 to 52-q, and a reference value from the first determination unit 5j.

The storage unit 5c stores the determination condition acquired and the reference value by the reference acquisition unit 5b in association with the time-series data. The storage unit 5c also stores the measured value and the estimated value of the base station 53. Table 7 is one example of data stored in the storage unit 5c. It is sufficient that the time-series data to be stored be the first index and it is not required to limit the type.

TABLE 7

|  |  | Base station 52-1 | Base station 52-2 | ... | Base station 52-q | Base station 53 |
|---|---|---|---|---|---|---|
| Time-series data | Measured value | 10, 15, 12 ... | 100, 131, 121 ... | ... | 0.1, 0.3, 0.2 ... | 1.0, 0.9, 1.0 ... |
|  | Estimated value | 11, 16, 13 ... | 110, 120, 120 ... | ... | 0.15, 0.31, 0.2 ... | 0.95, 0.92, 0.98 ... |
| Determination condition |  | Abnormal when ratio of measured value with respect to estimated value is below reference value | Abnormal when absolute value of difference between estimated value and measured value exceeds reference value | ... | Abnormal when ratio of estimated value with respect to measured value exceeds reference value | (None) |
| Reference value |  | 0.8 | 20 | ... | 2 | (None) |

The time-series data will be described in further detail. In the above-described first to third example embodiments, the server compares the measured value of the first index indicating the operation status of the base station with the estimated value of the first index indicating the operation status of the base station and determines that there is an abnormality in the base station when the result of the comparison does not satisfy the determination condition. The server may determine, for example, that there is an abnormality in the base station when the absolute value of the difference between the estimated value and the measured value exceeds a set threshold. Further, the server may determine that there is an abnormality in the base station when the ratio of the measured value with respect to the estimated value is below the threshold or may determine that there is an abnormality in the base station when the ratio of the estimated value with respect to the measured value exceeds the threshold. Ideally, there is no difference between the estimated value by the first model and the measured value. The ideal state is, for example, a state in which the absolute value of above difference is always 0 and the ratio is always 1. However, due to the reason that the accuracy of the first model is low, realistically, even when there is no abnormality in the base station, there is a difference between the measured value and the estimated value. Then it can be considered that the difference between them differs for each The learning unit 5d learns the relation between the time-series data, and the determination condition and the reference value using the machine learning algorithm. Specifically, the learning unit 5d learns, for the time-series data, which type of determination condition the operator selects and what reference value the operator sets. The data to be used for learning may be determined either by the operator or by the learning unit 5d. Further, the learning unit 5d may preferentially select time-series data for a longer period of time. In a case of time-series data in which a section of an abnormal state is shorter than a section of a normal state, an effect of improving the accuracy of the third model can be obtained. The machine learning algorithm used in this example embodiment may be an existing machine learning algorithm or may be a machine learning algorithm that will be developed in the future. The machine learning algorithm such as a linear regression or a neural network may be, for example, used. The third model generator 5e generates a third model from the results of the learning. The third model is a model for determining the determination condition and calculating the reference value when the time-series data is input. The data determination unit 5f determines the time-series data that automatically sets the determination condition and the reference value in the base station 53 from among the time-series data stored in the storage unit 5c. The determination of the time-series data may be performed by the operator. The data input unit 5g inputs some or all the sections of the time-series data determined by the data determination unit 5f into the third model. The section of the time-series data to be input may be set by the operator. When the time-series data of only the section in the state in which there is no abnormality is input, the effect of improving the accuracy of the reference value that the third model sets can be achieved. The reference calculation unit 5h determines, using the time-series data input by the data input unit 5g and the third model, the determination condition and calculates the reference value. The reference calculation unit 5h processes the time-series data of the measured value and the estimated value in accordance with the determination condition that has been determined. When, for example, the absolute value of the difference between the measured value and the estimated value is used for the determination condition, the reference calculation unit 5h generates the time-series data of the absolute value of the difference in the measured value and the estimated value using the time-series data of the measured value and the estimated value. In a case in which the ratio of the measured value to the estimated value is used for the determination condition as well, the reference calculation unit 5h similarly generates time-series data of the ratio. The third determination unit 5i compares the reference value that has been calculated with the time-series data determined by the data determination unit 5g using the determination condition that has been determined. When the result of the comparison does not satisfy the determination condition, the third determination unit 5i determines that there is an abnormality in the base station.

Figure 14A:
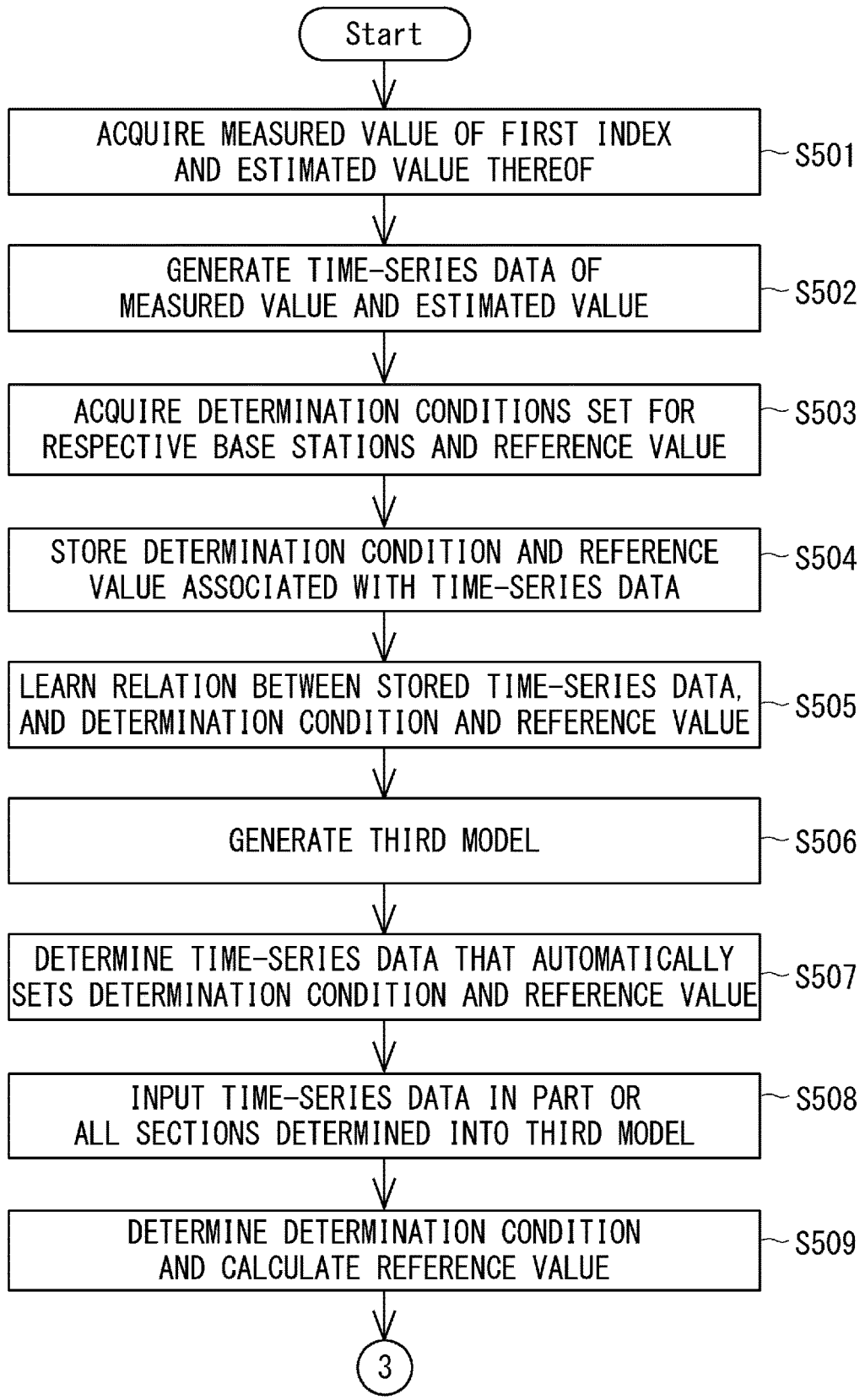
FIG. 14A is a flowchart showing one example of processing of the server according to the fifth example embodiment.
Figure 14B:
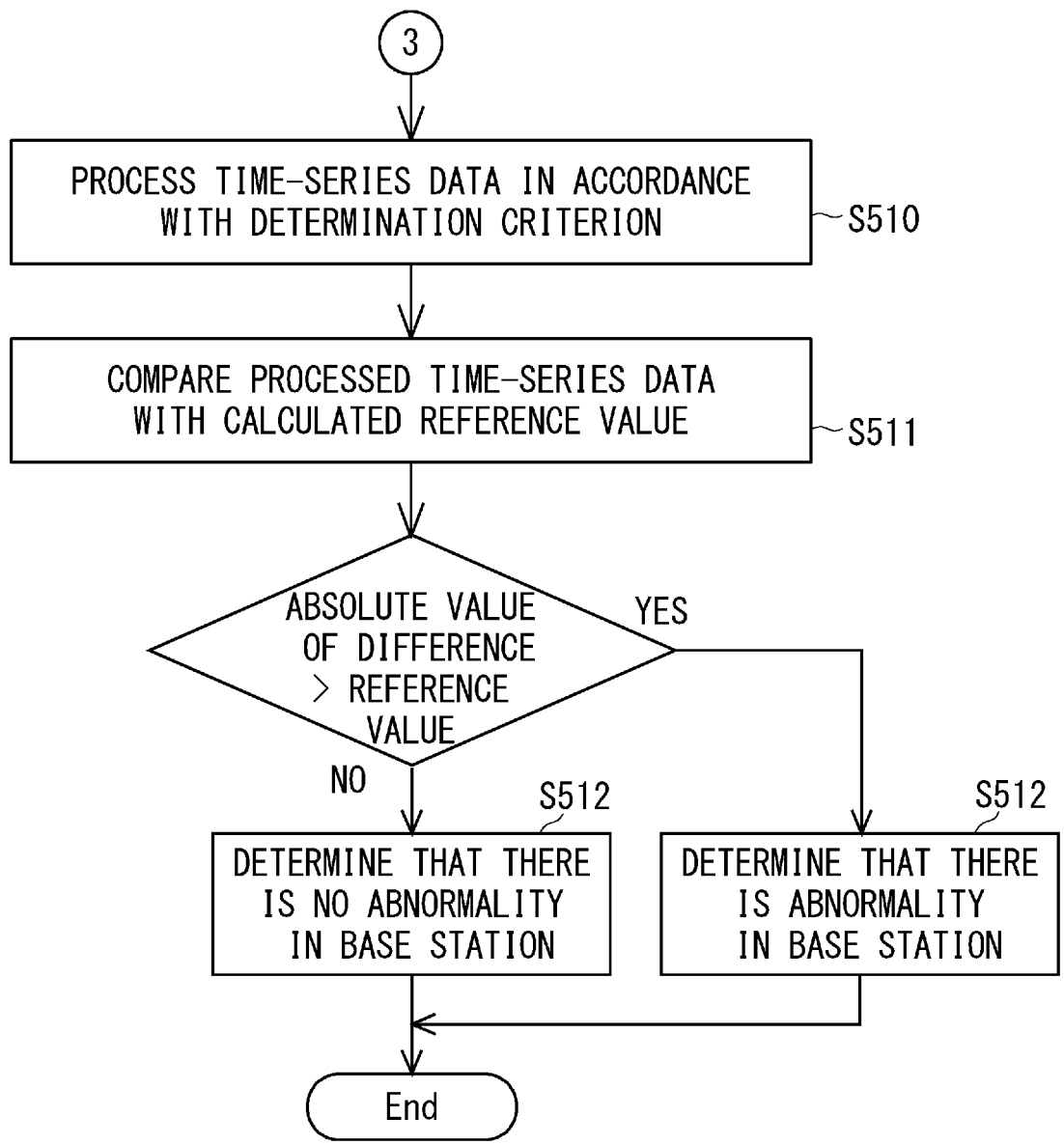
FIG. 14B is a flowchart showing one example of processing of the server according to the fifth example embodiment.

Referring next to FIGS. 14A and 14B, an operation of the server 51 according to this example embodiment will be described in further detail. FIGS. 14A and 14B are flowcharts showing processing in this example embodiment.

[Step S501] The time-series data generation unit 5a acquires the measured value of the first index indicating the operation status of the base station and the estimated value of the first index indicating the operation status of the base station in each of the plurality of base stations 52-1 to 52-q from the first determination unit 5j. The time interval of the measured value and the estimated value to be acquired is not particularly limited.

[Step S502] The time-series data generation unit 5a generates the time-series data of the measured value and the estimated value of the first index received from each of the plurality of base stations 52-1 to 52-q. It is sufficient that the type of the measured values and the estimated values to be acquired be the first index indicating the operation status of the base station, and it is not required to use a unified type in all the base stations. Further, the period of the time-series data to be generated is not particularly limited.

[Step S503] The reference acquisition unit 5b acquires the determination conditions and the reference value set for the plurality of respective base stations 52-1 to 52-q from the first determination unit 5j. The determination condition may be, for example, the one in which it is determined that there is an abnormality when the absolute value of the difference between the estimated value and the measured value exceeds the set threshold. Further, the determination condition may be the one in which it is determined that there is an abnormality when the ratio of the measured value with respect to the estimated value is below the threshold. In addition, the determination condition may be the one in which it is determined that there is an abnormality when the ratio of the estimated value with respect to the measured value exceeds the threshold. The reference value may be, for example, a threshold.

[Step S504] The storage unit 5c stores the determination condition and the reference value associated with the time-series data. The storage unit 5c stores the determination condition and the reference value associated with the time-series data, as shown in, for example, Table 7. Note that it is sufficient that the time-series data to be stored be the first index, and it is not required to limit the type of the time-series data.

[Step S505] The learning unit 5d learns the relation between the time-series data, and the determination condition and the reference value. Specifically, the learning unit 5d learns, for the time-series data, which type of determination condition the operator selects and what reference value the operator sets. The data to be used for learning may be determined either by the operator or by the learning unit 5d. Further, the learning unit 5d may preferentially select time-series data for a longer period of time. As the recorded time in the data to be used for learning becomes longer, the effect of improving the accuracy of the reference value that the third model calculates can be obtained. Further, the learning unit 5d may preferentially select the time-series data in which a section of an abnormal state is shorter than a section of a normal state. When the time-series data in which a section of an abnormal state is shorter than a section of a normal state is preferentially selected, the effect of improving the accuracy of the reference value that the third model calculates can be obtained. The machine learning algorithm used in this example embodiment may be an existing machine learning algorithm or may be a machine learning algorithm that will be developed in the future. The machine learning algorithm such as a linear regression or a neural network may be, for example, used.

[Step S506] The third model generator 5e generates the third model from the results of the learning. The third model is a model for determining the determination condition and calculating the reference value when the time-series data is input.

[Step S507] The data determination unit 5f determines the time-series data that automatically sets the determination condition and the reference value in the base station 53 from the time-series data whose determination condition and reference value have not been determined. Note that the determination of the time-series data may be performed by the operator. Further, a plurality of base stations 53 and a plurality of pieces of time-series data may be selected.

[Step S508] The data input unit 5g inputs a part or all of the data of the time-series data determined by the data determination unit 5f into the third model. The section of the time-series data to be input may be set by the operator. When only the time-series data in the state in which there is no abnormality is input, the effect of improving the accuracy of the reference value that the third model sets can be achieved.

[Step S509] The reference calculation unit 5h determines the determination condition using the time-series data input by the data input unit 5g and the third model and calculates the reference value.

[Step S510] The reference calculation unit 5h processes the time-series data of the measured value and the estimated value in accordance with the determination condition that has been determined. When, for example, the absolute value of the difference between the measured value and the estimated value is used as the determination condition, the reference calculation unit 5h generates time-series data of the absolute value of the difference in the measured value and the estimated value using the time-series data of the measured value and the estimated value. When the ratio of the measured value to the estimated value is used as the determination condition as well, the reference calculation unit 5h similarly generates time-series data of the ratio.

[Step S511] The third determination unit 5i compares the reference value calculated by the reference calculation unit 5h with the time-series data processed by the reference calculation unit 5h.

[Step S512] The third determination unit 5i determines that there is no abnormality in the base station when the result of the comparison satisfies the set determination condition and determines that there is an abnormality in the base station when the result of the comparison does not satisfy the set determination condition. The flowchart shown in FIG. 14B is one example when the absolute value of the difference is used as the determination condition. The ratio of the estimated value with respect to the measured value or the ratio of the measured value with respect to the estimated value may instead be, but not limited thereto, used.

According to this example embodiment, the server 51 is able to automatically set the determination condition for determining an abnormality for the base station and the reference value for determining the abnormality using the time-series data of the measured value received from the base station, time-series data of the estimated value, and the third model. This leads to reduction in the burden on the operator.

[Program]

A program according to the present disclosure may be a program for causing a computer to execute Steps S101 to S105 shown in FIG. 2, Steps S201 to S213 shown in FIGS. 5A and 5B, Steps S301 to S314 shown in FIGS. 8A and 8B, Step S401 to S410 shown in FIG. 11, and Steps S501 to S512 shown in FIGS. 14A and 14B. This program may be installed into a computer and executed, whereby it is possible to achieve the servers 11, 21, 31, 41, and 51 and the control method of the server in the present disclosure. In this case, a Central Processing Unit (CPU) of the computer serves as the receiver 1a, the first model generator 1b, the calculation unit 1c, the first determination unit 1d, the receiver 2a, the dividing unit 2b, the processing unit 2c, the time zone determination unit 2e, the first learning unit 2f, the first model generator 2g, the calculation unit 2h, the first determination unit 2i, the receiver 3a, the dividing unit 3b, the processing unit 3c, the base station determination unit 3e, the time zone determination unit 3f, the first learning unit 3g, the first model generator 3h, the calculation unit 3i, the first determination unit 3j, the second learning unit 4b, the second model generator 4c, the data determination unit 4d, the data input unit 4e, the second determination unit 4f, the time-series data generation unit 5a, the reference acquisition unit 5b, the third learning unit 5d, the third model generator 5e, the data determination unit 5f, the data input unit 5g, the reference calculation unit 5h, the third determination unit 5i, and the first determination unit 5j and performs processing.

Further, the program according to the present disclosure may be executed by a computer system constructed by a plurality of computers. In this case, for example, each of the computers may function as one of the receiver 1a, the first model generator 1b, the calculation unit Tc, the first determination unit Td, the receiver 2a, the dividing unit 2b, the processing unit 2c, the time zone determination unit 2e, the first learning unit 2f, the first model generator 2g, the calculation unit 2h, the first determination unit 2i, the receiver 3a, the dividing unit 3b, the processing unit 3c, the base station determination unit 3e, the time zone determination unit 3f, the first learning unit 3g, the first model generator 3h, the calculation unit 3i, the first determination unit 3j, the second learning unit 4b, the second model generator 4c, the data determination unit 4d, the data input unit 4e, the second determination unit 4f, the time-series data generation unit 5a, the reference acquisition unit 5b, the third learning unit 5d, the third model generator 5e, the data determination unit 5f, the data input unit 5g, the reference calculation unit 5h, the third determination unit 5i, and the first determination unit 5j.

The program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (compact disc read only memory), CD-R (compact disc recordable), CD-R/W (compact disc rewritable), and semiconductor memories (such as mask ROM, PROM (programmable ROM), EPROM (erasable PROM), flash ROM, RAM (random access memory), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g. electric wires, and optical fibers) or a wireless communication line.

[Physical Structure]

Figure 15:
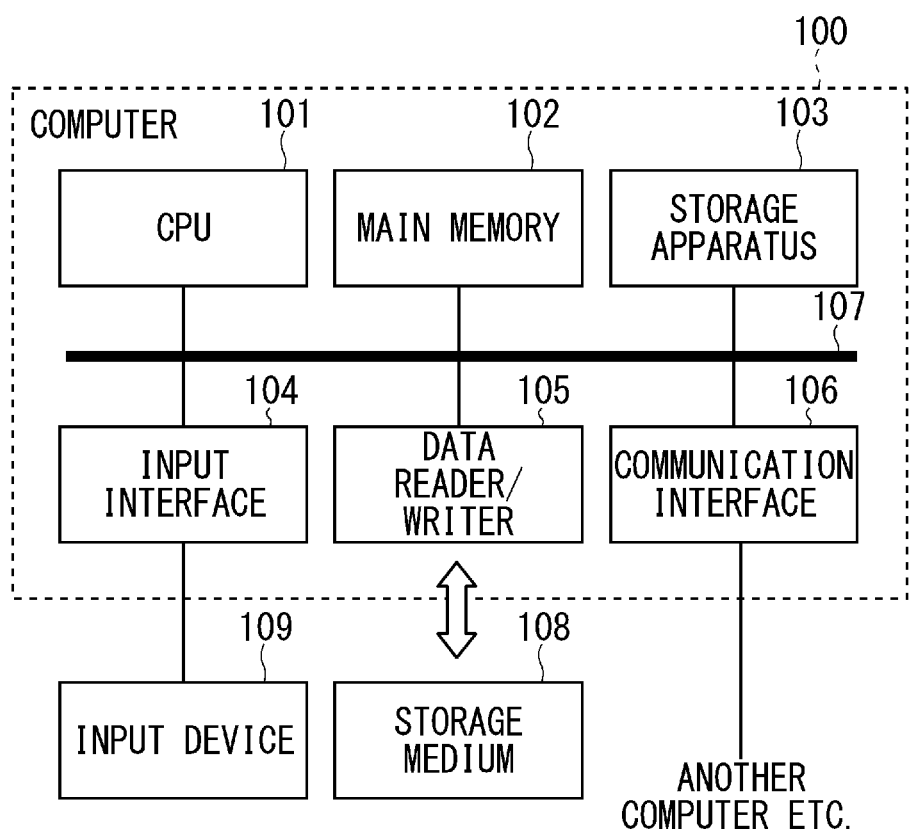
FIG. 15 is a block diagram showing one example of a computer that implements a server according to an example embodiment of the present disclosure.

As shown in FIG. 15, a computer 100 includes a CPU 101, a main memory 102, a storage apparatus 103, an input interface 104, a data reader/writer 105, and a communication interface 106. These parts are connected to one another via a bus 107 in such a way that they can communicate data.

The CPU 101 executes various operations by deploying, in the main memory 102, the program (code) according to the present disclosure stored in the storage apparatus 103 and executing them in a predetermined order. Typically, the main memory 102 is a volatile storage apparatus such as a Dynamic Random Access Memory (DRAM). Further, the program according to the present disclosure is provided in a state in which the computer is stored in a readable storage medium 108. Note that the program according to the present disclosure may be the one distributed on the Internet connected via the communication interface 106.

Further, specific examples of the storage apparatus 103 may be, besides a hard disc drive, a semiconductor storage device such as a flash memory. The input interface 104 mediates data forwarding between the CPU 101 and an input device 109 such as a keyboard and a mouse.

The data reader/writer 105 mediates data forwarding between the CPU 101 and the storage medium 108, reads out a program from the storage medium 108, and executes writing of the results of the processing in the computer 100 into the storage medium 108. The communication interface 106 mediates data forwarding between the CPU 101 and another computer.

Further, specific examples of the storage medium 108 may be a general-purpose semiconductor storage device such as a Compact Flash (CF (registered trademark)) and a Secure Digital (SD), a magnetic storage medium such as a flexible disk and a hard disc, or an optical storage medium such as a Compact Disk Read Only Memory (CD-ROM).

The servers 11, 21, 31, 41, and 51 according to the present disclosure may be implemented by using hardware that correspond to the respective parts, not by the computer in which the program is installed. Further, some of the servers 11, 21, 31, 41, and 51 may be implemented by the program and the others of them may be implemented by hardware.

The whole or part of the example embodiments disclosed above can be described as, but not limited to, the following (Supplementary Note 1) to (Supplementary Note 13).

(Supplementary Note 1)

A server comprising:

a receiver configured to receive a plurality of types of data from a base station;

a first model generator configured to generate a first model from the plurality of types of data;

a calculation unit configured to calculate an estimated value of an index indicating an operation status of the base station using the first model generated by the first model generator; and a first determination unit configured to compare the estimated value of the index indicating the operation status of the base station with a measured value of the index indicating the operation status of the base station and determine that there is an abnormality in the base station when the result of the comparison does not satisfy a determination condition.

(Supplementary Note 2)

The server according to Supplementary Note 1, wherein the receiver acquires the plurality of types of data from each of a plurality of base stations.

(Supplementary Note 3)

The server according to Supplementary Note 1 or 2, wherein the plurality of types of data comprise data of a type related to a traffic amount of the base station and data of a type for estimating the traffic amount.

(Supplementary Note 4)

The server according to any one of Supplementary Notes 1 to 3, wherein the plurality of types of data comprise information regarding installation of the base station.

(Supplementary Note 5)

The server according to Supplementary Note 4, wherein the information regarding the installation comprises at least one of positional information of the base station, information on an area covered by the base station, and information on the angle of an antenna that the base station includes.

(Supplementary Note 6)

The server according to any one of Supplementary Notes 1 to 5, wherein the receiver acquires data of a type regarding the base station other than the plurality of types of data from a device other than the base station, and the first model generator uses, besides the plurality of types of data, the data acquired from the device for generating the first model.

(Supplementary Note 7)

The server according to any one of Supplementary Notes 1 to 6, wherein the server generates a second model from a plurality of types of data on which a cause of an abnormality has been labeled, and the server determines the cause of the abnormality from the second model and a plurality of types of data in a base station that has been determined to have an abnormality.

(Supplementary Note 8)

The server according to any one of Supplementary Notes 2 to 7, wherein the server generates a third model using time-series data of the estimated value calculated by the calculation unit and the measured value and a criterion;

the server sets, for time-series data in a base station in which the criterion has not been set, the criterion using the third model, the server compares the estimated value with the measured value, and the server determines that there is an abnormality in the base station when the result of the comparison does not satisfy the criterion.

(Supplementary Note 9)

A server comprising:

a receiver configured to receive a plurality of types of data from each of a plurality of base stations;

a model generator configured to generate a first model from the plurality of types of data in a base station other than a base station regarding which it is determined whether it has an abnormality;

a calculation unit configured to calculate an estimated value of an index indicating an operation status of the base station regarding which it is determined whether it has an abnormality using the plurality of types of data in the base station regarding which it is determined whether it has an abnormality and the first model generated by the model generator; and an abnormality determination unit configured to compare the estimated value of the index indicating the operation status of the base station regarding which it is determined whether it has an abnormality with a measured value of the index indicating the operation status of the base station and determine that there is an abnormality in the base station when the result of the comparison between the estimated value and the measured value does not satisfy a criterion.

(Supplementary Note 10)

A control method of a server, comprising:

receiving a plurality of types of data from a base station;

generating a first model from the plurality of types of data;

calculating an estimated value of an index indicating an operation status of the base station using the first model generated by the model generator; and comparing the estimated value of the index indicating the operation status of the base station with a measured value of the index indicating the operation status of the base station and determining that there is an abnormality in the base station when the estimated value and the measured value do not satisfy the criterion.

(Supplementary Note 11)

The server according to Supplementary Note 7, wherein the server includes a labeling unit, and the labeling unit puts a label which describes a real cause of the abnormality found when an abnormality in the base station regarding which it is determined whether it has an abnormality was confirmed onto a plurality of types of data in the base station regarding which it is determined whether it has an abnormality, the plurality of types of data being used by the server when determining the cause of the abnormality.

(Supplementary Note 12)

The server according to Supplementary Note 7 or 11, wherein the server updates the second model using the plurality of types of data that have been labeled.

(Supplementary Note 13)

The server according to any one of Supplementary Notes 1 to 12, wherein the determination condition comprises a first threshold in an absolute value of the difference between the estimated value and the measured value, a second threshold in a ratio of the measured value to the estimated value, or a third threshold in a ratio of the estimated value to the measured value.

The example embodiments can be combined as desirable by one of ordinary skill in the art.

While the present disclosure has been described with reference to the example embodiments, the present disclosure is not limited by the above example embodiments. Various changes that may be understood by those skilled in the art may be made to the configurations and the details of the present disclosure within the scope of the present disclosure.

INDUSTRIAL APPLICABILITY

As described above, according to the present disclosure, it is possible to detect an abnormality in a radio base station more accurately. The present disclosure is useful for the field related to radio communications.

What is claimed is:

1. A server comprising at least one memory storing instructions, and at least one processor configured to execute the instructions to:
receive a plurality of types of data from a base station;
generate a first model from the plurality of types of data;
calculate an estimated value of an index indicating an operation status of the base station using the generated first model, the estimated value of the index indicating the operation status of the base station being used for determining the presence of an abnormality of the base station;
compare the estimated value of the index indicating the operation status of the base station with a measured value of the index indicating the operation status of the base station; and
determine that there is an abnormality in the base station when the result of the comparison does not satisfy a determination condition and determine that there is no abnormality in the base station when the result of the comparison satisfies the determination condition,
wherein the plurality of types of data comprise information regarding installation of the base station, and
wherein the information regarding the installation comprises at least one of positional information of the base station, information on an area covered by the base station, and information on an angle of an antenna that the base station includes.

2. The server according to claim 1, wherein the processor is further configured to acquire the plurality of types of data from each of a plurality of base stations.

3. The server according to claim 2, wherein the processor is further configured to:
generate a third model using time-series data of the calculated estimated value and the measured value and the determination condition;
determine, for time-series data in a base station in which the determination condition has not been set, the determination condition using the third model;
compare the estimated value with the measured value; and
determine that there is an abnormality in the base station when the result of the comparison does not satisfy the determination condition and determine that there is no abnormality in the base station when the result of the comparison satisfies the determination condition.

4. The server according to claim 1, wherein the plurality of types of data comprise data of a type related to a traffic amount of the base station and data of a type for estimating the traffic amount.

5. The server according to claim 1, wherein the processor is further configured to:
acquire data of a type regarding the base station other than the plurality of types of data from a device other than the base station, and
generate the first model using, besides the plurality of types of data, the data acquired from the device.

6. The server according to claim 1, wherein the processor is further configured to:
generate a second model from a plurality of types of data on which a cause of an abnormality has been labeled; and
determine the cause of the abnormality from the second model and a plurality of types of data in a base station that has been determined to have an abnormality.

7. The server according to claim 6, wherein the processor is further configured to put a label which describes a real cause of the abnormality found when an abnormality in the base station regarding which it is determined whether it has an abnormality was confirmed onto a plurality of types of data in the base station regarding which it is determined whether it has an abnormality, the plurality of types of data being used by the server when determining the cause of the abnormality.

8. The server according to claim 6, wherein the server updates the second model using the plurality of types of data that have been labeled.

9. The server according to claim 1, wherein the determination condition comprises a first threshold in an absolute value of the difference between the estimated value and the measured value, a second threshold in a ratio of the measured value to the estimated value, or a third threshold in a ratio of the estimated value to the measured value.

10. The server according to claim 1, wherein a cause of the abnormality is identified by a second model, and the second model is trained based on actual inspection results of failed base stations.

11. A server comprising at least one memory storing instructions, and at least one processor configured to execute the instructions to;
receive a plurality of types of data from each of a plurality of base stations;
generate a first model from the plurality of types of data in a base station other than a base station regarding which it is determined whether it has an abnormality;
calculate an estimated value of an index indicating an operation status of the base station regarding which it is determined whether it has an abnormality using the plurality of types of data in the base station regarding which it is determined whether it has an abnormality and the first generated model, the estimated value of the index indicating the operation status of the base station being used for determining the presence of an abnormality of the base station;
compare the estimated value of the index indicating the operation status of the base station regarding which it is determined whether it has an abnormality with a measured value of the index indicating the operation status of the base station; and
determine that there is an abnormality in the base station when the result of comparing the estimated value with the measured value does not satisfy a determination condition and determine that there is no abnormality in the base station when the result of comparing the estimated value with the measured value satisfies the determination condition,
wherein the plurality of types of data comprise information regarding installation of the base station, and
wherein the information regarding the installation comprises at least one of positional information of the base station, information on an area covered by the base station, and information on an angle of an antenna that the base station includes.

12. A control method of a server comprising:
receiving a plurality of types of data from a base station;
generating a first model from the plurality of types of data;
calculating an estimated value of an index indicating an operation status of the base station using the first model, the estimated value of the index indicating the operation status of the base station being used for determining the presence of an abnormality of the base station;
comparing the estimated value of the index indicating the operation status of the base station with a measured value of the index indicating the operation status of the base station; and
determining that there is an abnormality in the base station when the estimated value and the measured value do not satisfy a determination condition and determining that there is no abnormality in the base station when the estimated value and the measured value satisfies the determination condition,
wherein the plurality of types of data comprise information regarding installation of the base station, and
wherein the information regarding the installation comprises at least one of positional information of the base station, information on an area covered by the base station, and information on an angle of an antenna that the base station includes.

* * * * *